United States Patent
Seibel et al.

(10) Patent No.: US 11,799,797 B2
(45) Date of Patent: Oct. 24, 2023

(54) EDGE UTILITY SYSTEM WITH USER-CONFIGURABLE TRUST SETTINGS FOR DYNAMIC AGGREGATION OF EDGE RESOURCES

(71) Applicant: Dell Products L.P., Round Rock, TX (US)

(72) Inventors: Amy N. Seibel, Newton, MA (US); Victor Fong, Melrose, MA (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 17/682,406

(22) Filed: Feb. 28, 2022

(65) Prior Publication Data

US 2023/0275850 A1 Aug. 31, 2023

(51) Int. Cl.
*H04L 47/70* (2022.01)
*H04L 9/40* (2022.01)

(52) U.S. Cl.
CPC .............. *H04L 47/82* (2013.01); *H04L 63/20* (2013.01)

(58) Field of Classification Search
CPC .............................. H04L 47/82; H04L 63/20
See application file for complete search history.

(56) References Cited

U.S. PATENT DOCUMENTS

| | | | |
|---|---|---|---|
| 10,484,341 B1 | 11/2019 | Todd et al. | |
| 10,756,904 B1 | 8/2020 | Perlman et al. | |
| 10,855,758 B1 | 12/2020 | O'Connell et al. | |
| 10,855,778 B2 | 12/2020 | Todd et al. | |
| 11,063,745 B1 | 7/2021 | Du et al. | |
| 11,128,437 B1 | 9/2021 | Nossik et al. | |
| 2021/0021619 A1* | 1/2021 | Smith | H04L 63/145 |
| 2021/0374841 A1 | 12/2021 | Fong et al. | |
| 2022/0124098 A1* | 4/2022 | Shiralkar | H04L 63/20 |
| 2022/0210142 A1* | 6/2022 | Sohail | H04L 63/00 |
| 2023/0083952 A1* | 3/2023 | O'Neill | G06N 5/04 |

OTHER PUBLICATIONS

U.S. Appl. No. 17/451,782, filed Oct. 21, 2021, and entitled "Use of IO Event Metadata to Enable Xaas Billing and Analytics."

\* cited by examiner

*Primary Examiner* — Bryan Y Lee
(74) *Attorney, Agent, or Firm* — Ryan, Mason & Lewis, LLP

(57) ABSTRACT

A method includes receiving from a first user in an edge utility system information specifying a trust level for one or more providers of edge resources, and aggregating edge resources of a plurality of edge computing sites of the edge utility system, the aggregated edge resources including at least edge resources of the one or more providers. The method further includes selecting particular ones of the aggregated edge resources based at least in part on the specified trust level, and utilizing the selected particular ones of the aggregated edge resources to execute at least a portion of a workload of the first user. The method may include tracking trust factors for each of the one or more providers over time, with the selection of particular ones of the aggregated edge resources being based at least in part on the one or more tracked trust factors and the specified trust level.

20 Claims, 16 Drawing Sheets

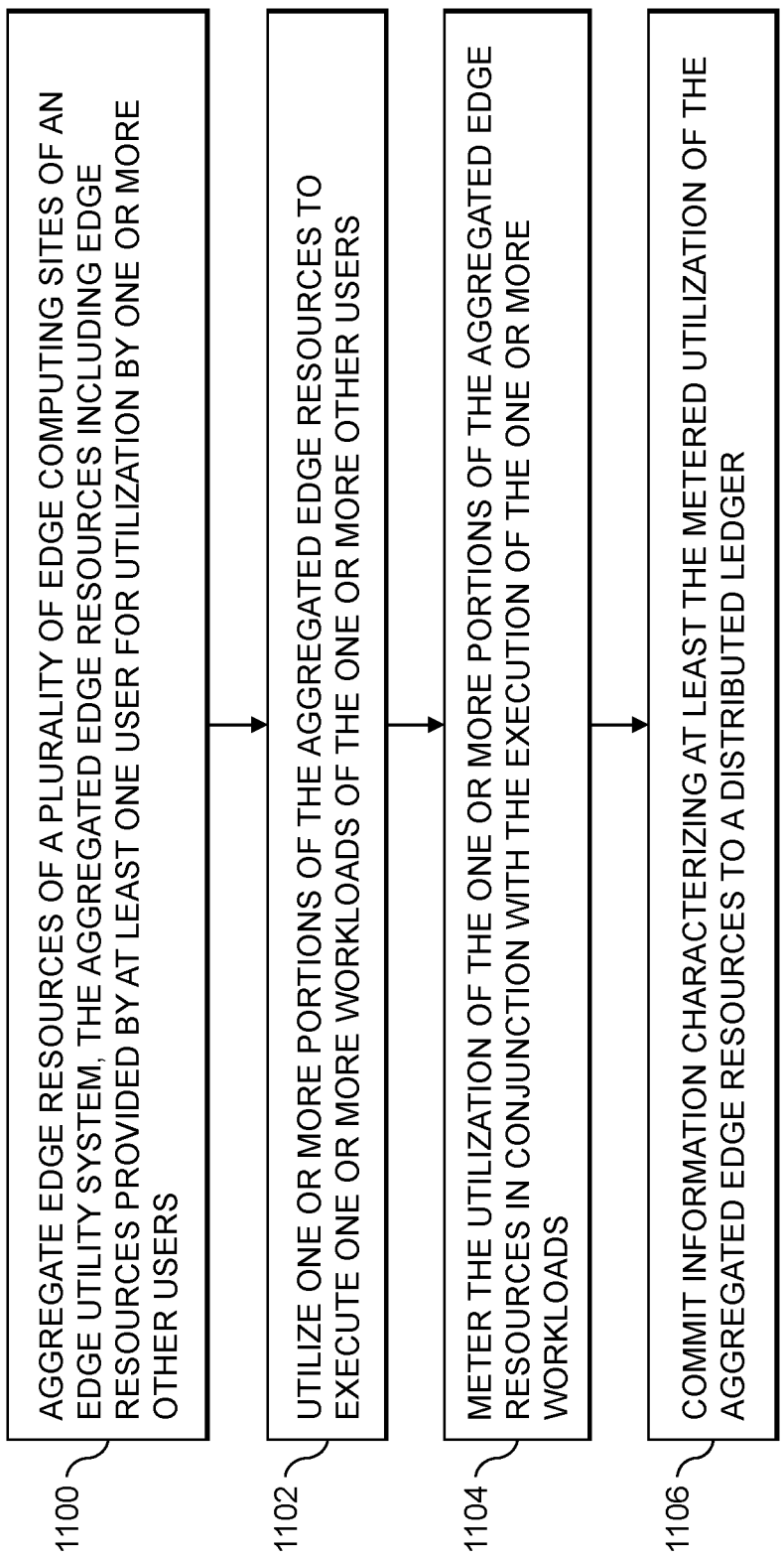

Sample Trust Factors

Current Status 1202
- Part of Trusted Network
- Verified via Attestation or Similar Mechanism
- No Active Security Compromise
- Active Security Monitoring
- SLAs
- Trust Ratings
- Price Relative to Mean
- Performance Relative to Mean
- ...

Historical Data 1204
- Performance Relative to Mean
- Historical Performance
- History of Security Compliance
- Prior Transaction Relationship
- Historical SLA Compliance/Handling of Violations
- Historical Price vs. Mean
- ...

EDGE UTILITY SYSTEM WITH USER-CONFIGURABLE TRUST SETTINGS FOR DYNAMIC AGGREGATION OF EDGE RESOURCES

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant technical problems can arise in the management of resources in these and other information processing systems, such as ensuring that adequate resources are available to service varying workload demand.

SUMMARY

Illustrative embodiments of the present disclosure provide techniques for user-configurable trust settings for dynamic aggregation of edge resources across multiple edge computing sites. The techniques are illustratively implemented in what is referred to herein as an "edge utility system" comprising distributed core and edge computing sites having respective sets of resources, such as compute, storage and network resources.

These and other embodiments disclosed herein advantageously overcome one or more of the above-noted technical problems, by providing technical solutions in which edge resources of multiple edge computing sites are dynamically aggregated in a highly efficient and reliable manner that facilitates the servicing of varying workload demand from a potentially large number of users in an information processing system.

In one embodiment, an apparatus comprises at least one processing device comprising a processor coupled to a memory. The at least one processing device is configured to receive from a first user in an edge utility system information specifying a trust level for one or more providers of edge resources, and to aggregate edge resources of a plurality of edge computing sites of the edge utility system, the aggregated edge resources including at least edge resources of the one or more providers. The at least one processing device is further configured to select particular ones of the aggregated edge resources based at least in part on the specified trust level, and to utilize the selected particular ones of the aggregated edge resources to execute at least a portion of a workload of the first user.

Other illustrative embodiments include, by way of example and without limitation, methods and computer program products comprising non-transitory processor-readable storage media.

BRIEF DESCRIPTION OF THE DRAWINGS

FIG. 11 is a flow diagram of an exemplary process implementing distributed ledger verification for dynamic aggregation of edge resources in an illustrative embodiment.

FIG. 12 shows examples of trust factors that can be utilized in user-configured trust settings for dynamic aggregation of edge resources in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources, or an enterprise-based information processing system, or combinations thereof. Numerous other types of enterprise and cloud-based computing and storage systems are also encompassed by the term "information processing system" as that term is broadly used herein.

Figure 1:
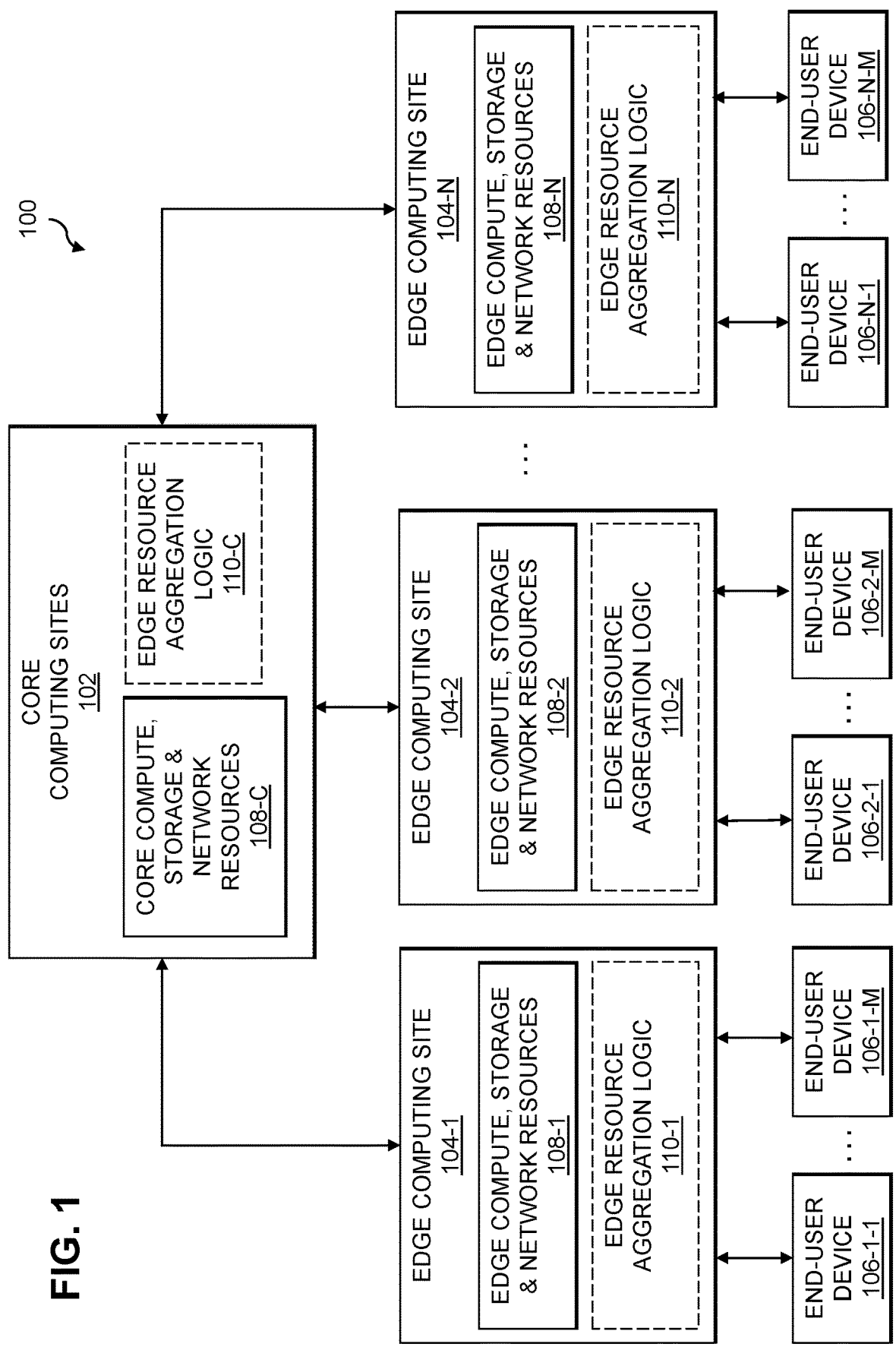
FIG. 1 is a block diagram of an information processing system configured for dynamic aggregation of edge resources across multiple edge computing sites in an illustrative embodiment.

FIG. 1 shows an information processing system 100 configured with functionality for dynamic aggregation of edge resources in an illustrative embodiment. The information processing system 100 comprises one or more core computing sites 102 coupled to a plurality of edge computing sites 104-1, 104-2, . . . 104-N, collectively referred to as edge computing sites 104. Each of the edge computing sites 104 illustratively has multiple end-user devices 106 associated therewith. More particularly, a first set of end-user devices 106-1-1, . . . 106-1-M are coupled to edge computing site 104-1, a second set of end-user devices 106-2-1, . . . 106-2-M are coupled to edge computing site 104-2, and a final set of end-user devices 106-N-1, . . . 106-N-M are coupled to edge computing site 104-N. The sets of end-user devices 106-1, 106-2, . . . 106-N are collectively referred to as end-user devices 106. It should be noted that the values M and N are arbitrary integers, where N is greater than or equal to two and M is greater than or equal to one. In other embodiments, different numbers of end-user devices 106 may be coupled to each of the edge computing sites 104.

Also, although each of the end-user devices 106 is illustrated in the figure as being coupled to a particular one of the edge computing sites 104, this is by way of example only, and a given one of the end-user devices 106 may be coupled to multiple ones of the edge computing sites 104 at the same time, or to different ones of the edge computing sites 104 at different times. Additionally or alternatively, one or more of the end-user devices 106 may be coupled to at least one of the one or more core computing sites 102.

The one or more core computing sites 102 may each comprise one or more data centers or other types and arrangements of core nodes. The edge computing sites 104 may each comprise one or more edge stations or other types and arrangements of edge nodes. Each such node or other computing site comprises at least one processing device that includes a processor coupled to a memory.

The end-user devices 106 are illustratively implemented as respective computers or other types and arrangements of processing devices. Such processing devices can include, for example, desktop computers, laptop computers, tablet computers, mobile telephones, Internet of Things (IoT) devices, or other types of processing devices, as well as combinations of multiple such devices. One or more of the end-user devices 106 can additionally or alternatively comprise virtualized computing resources, such as virtual machines (VMs), containers, etc. Although the end-user devices 106 are shown in the figure as being separate from the edge computing sites 104, this is by way of illustrative example only, and in other embodiments one or more of the end-user devices 106 may be considered part of their corresponding edge computing sites 104 and may in some embodiments comprise a portion of the edge resources of those corresponding edge computing sites 104.

The end-user devices 106 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The system 100 comprising the one or more core computing sites 102, the edge computing sites 104 and the end-user devices 106 is an example of what is more generally referred to herein as an "edge utility system." Other examples of edge utility systems are described elsewhere herein, and the term is intended to be broadly construed to encompass, for example, various arrangements in which usage of edge resources by system users can be metered or otherwise controlled in conjunction with dynamic aggregation of edge resources for execution of workloads on behalf of such users.

The one or more core computing sites 102 illustratively comprise at least one data center implemented at least in part utilizing cloud infrastructure. Each of the edge computing sites 104 illustratively comprises a plurality of edge devices and at least one edge utility meter configured to measure utilization of the edge devices of that edge computing site by one or more of the users in the edge utility system.

The term "user" herein is intended to be broadly construed so as to encompass numerous arrangements of human, hardware, software or firmware entities, as well as combinations of such entities. References herein to users "in" an edge utility system are intended to be broadly construed, so as to encompass, for example, users that are physically located external to the edge utility system but are associated with that system by, for example, registering with the system to provide or access edge resources in the manner disclosed herein.

Compute, storage and/or network services may be provided for users in some embodiments under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other arrangements could be used.

Although not explicitly shown in FIG. 1, one or more networks are assumed to be deployed in system 100 to interconnect the one or more core computing sites 102, the edge computing sites 104 and the end-user devices 106. Such networks can comprise, for example, a portion of a global computer network such as the Internet, a wide area network (WAN), a local area network (LAN), a satellite network, a telephone or cable network, a cellular network such as 4G or 5G network, a wireless network such as a WiFi or WiMAX network, or various portions or combinations of these and other types of networks. The system 100 in some embodiments therefore comprises combinations of multiple different types of networks. Such networks can support inter-device communications utilizing Internet Protocol (IP) and/or a wide variety of other communication protocols.

In some embodiments, a first type of network (e.g., a public network) couples the end-user devices 106 to the edge computing sites 104, while a second type of network (e.g., a private network) couples the edge computing sites 104 to the one or more core computing sites 102, although numerous other arrangements can be used.

The one or more core computing sites 102 and the edge computing sites 104 illustratively execute at least portions of various workloads for system users. Such workloads may comprise one or more applications, portions of one or more applications, or other types and arrangements of executable program code. As used herein, the term "application" is intended to be broadly construed to encompass, for example, microservices and other types of services implemented in software executed by the sites 102 or 104. Such applications can include core-hosted applications running on the one or more core computing sites 102 and edge-hosted applications running on the edge computing sites 104.

Workloads comprising such applications or portions thereof are assumed to be executed at least in part utilizing dynamically aggregated edge resources, as will now be now be described in more detail.

In system 100, the edge computing sites 104-1, 104-2, . . . 104-N comprise respective sets of edge compute, storage and/or network resources 108-1, 108-2, . . . 108-N. A given such set of edge resources illustratively comprises at least one of compute, storage and network resources of one or more edge devices of the corresponding edge computing site. The edge computing sites 104 further comprise respective instances of edge resource aggregation logic 110-1, 110-2, . . . 110-N. Similarly, the one or more core computing sites 102 comprise one or more sets of core compute, storage and/or network resources 108-C and one or more instances of edge resource aggregation logic 110-C.

Edge compute resources of the edge computing sites 104 can include, for example, various arrangements of processors, possibly including associated accelerators, as described in more detail elsewhere herein.

Edge storage resources of the edge computing sites 104 can include, for example, one or more storage systems or portions thereof that are part of or otherwise associated with the edge computing sites 104. A given such storage system may comprise, for example, all-flash and hybrid flash storage arrays, software-defined storage systems, cloud storage systems, object-based storage system, and scale-out distributed storage clusters. Combinations of multiple ones of these and other storage types can also be used in implementing a given storage system in an illustrative embodiment.

Edge network resources of the edge computing sites 104 can include, for example, resources of various types of network interface devices providing particular bandwidth, data rate and communication protocol features.

One or more of the edge computing sites 104 each comprise a plurality of edge devices, with a given such edge device comprising a processing device that includes a processor coupled to a memory. Such edge computing sites 104 also illustratively include at least one edge utility meter configured to measure utilization of the edge devices of that edge computing site by one or more of the users. The edge utility meter, which is not explicitly shown in this figure, is in some embodiments implemented as part of the corresponding instance of the edge resource aggregation logic 110 in a given one of the edge computing sites 104. In other embodiments, separate edge utility meters can be provided for each of a plurality of edge devices within a given one of the edge computing sites 104. For example, in some embodiments, one or more edge utility meters are implemented directly on each of at least a subset of the edge devices of each of the edge computing sites 104, although numerous other arrangements are possible.

The one or more core computing sites 102 of the system 100 may comprise, for example, at least one data center implemented at least in part utilizing cloud infrastructure. It is to be appreciated, however, that illustrative embodiments disclosed herein do not require the use of cloud infrastructure.

The instances of edge resource aggregation logic 110 are collectively configured to implement functionality for dynamic aggregation of edge resources of the edge computing sites 104 in system 100.

For example, in some embodiments, at least one processing device of the system 100, which may be part of the one or more core computing sites 102 and/or the edge computing sites 104, is illustratively configured to receive inputs for respective users in the system 100, with at least a first one of the inputs for a first one of the users characterizing edge resources requested by that user for executing at least a portion of a workload of that user, and at least a second one of the inputs for a second one of the users characterizing edge resources available from that user for executing at least a portion of a workload of another user. The at least one processing device is further configured to populate one or more data structures based at least in part on the plurality of inputs received for the respective users, to aggregate edge resources of multiple ones of the edge computing sites into an edge network based at least in part on the populated data structures, and to utilize at least a portion of the aggregated edge resources of the edge network to execute at least a portion of a workload of a particular one of the users.

Such operations in some embodiments represent an example algorithm performed by one or more instances of the edge resource aggregation logic 110 in one or more of the core computing sites 102 and/or edge computing sites 104. The algorithm is illustratively implemented utilizing processor and memory components of at least one processing platform that includes the at least one processing device. For example, at least portions of the edge resource aggregation logic 110 may be implemented at least in part in the form of software that is stored in memory and executed by a processor.

The term "edge network" as used herein is intended to be broadly construed, so as to encompass, for example, an arrangement of aggregated edge resources of different ones of the edge computing sites 104 configured for performance of one or more workloads or portions of combinations thereof.

In some embodiments, the aggregated edge resources of the edge network are arranged in a multi-level hierarchy with communication of information between levels of the hierarchy being handled by corresponding controllers implemented at respective ones of those levels. For example, edge devices or corresponding edge resources at a relatively low level of the hierarchy can communicate as a group via an associated local controller with edge devices or corresponding edge resources at a relatively high level of the hierarchy. Each such level can therefore have its own corresponding local controller that controls the particular edge devices or associated edge resources at that level.

Figure 7:
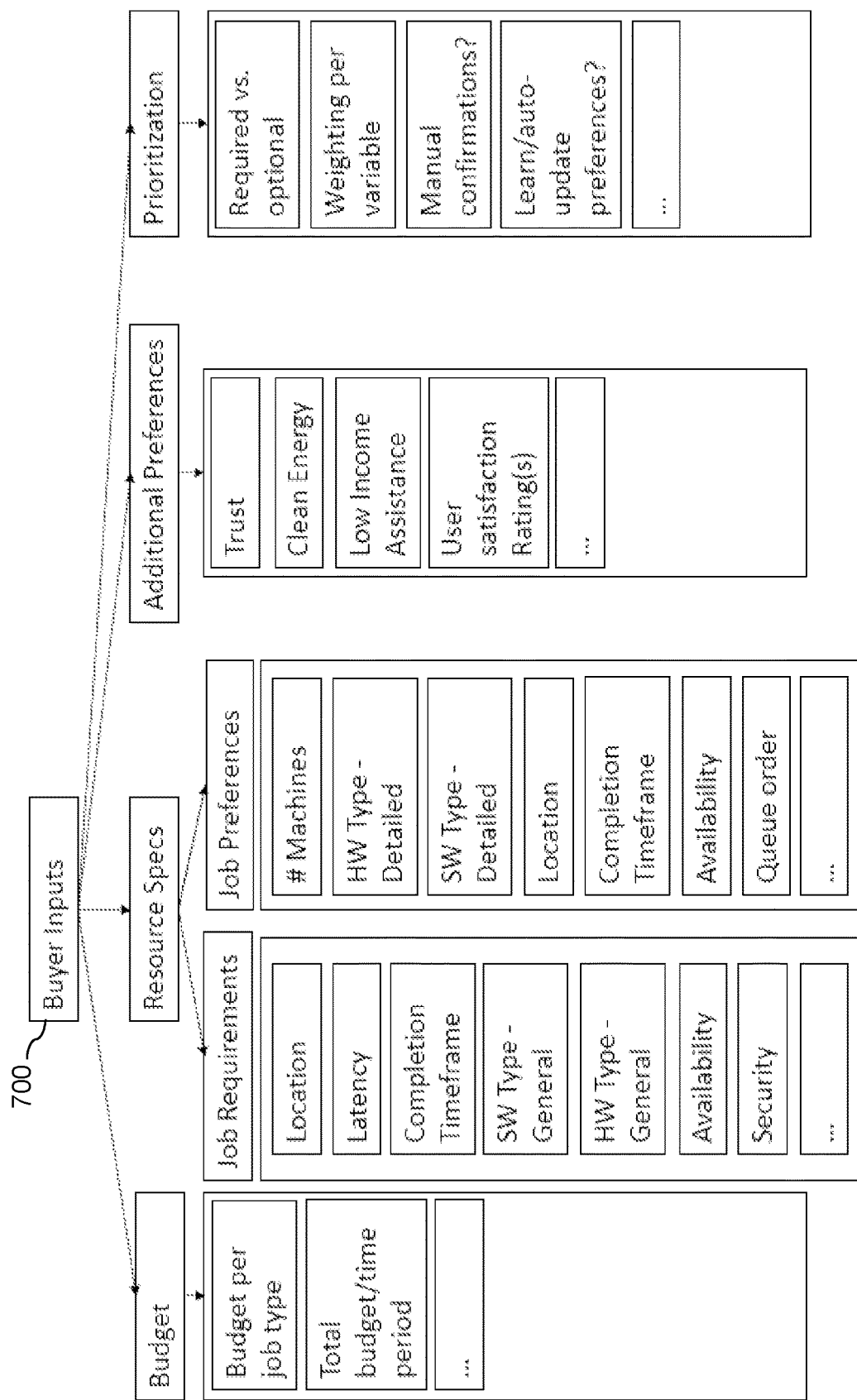
FIGS. 7 and 8 show respective examples of buyer and seller inputs in an edge utility system in an illustrative embodiment.
Figure 8:
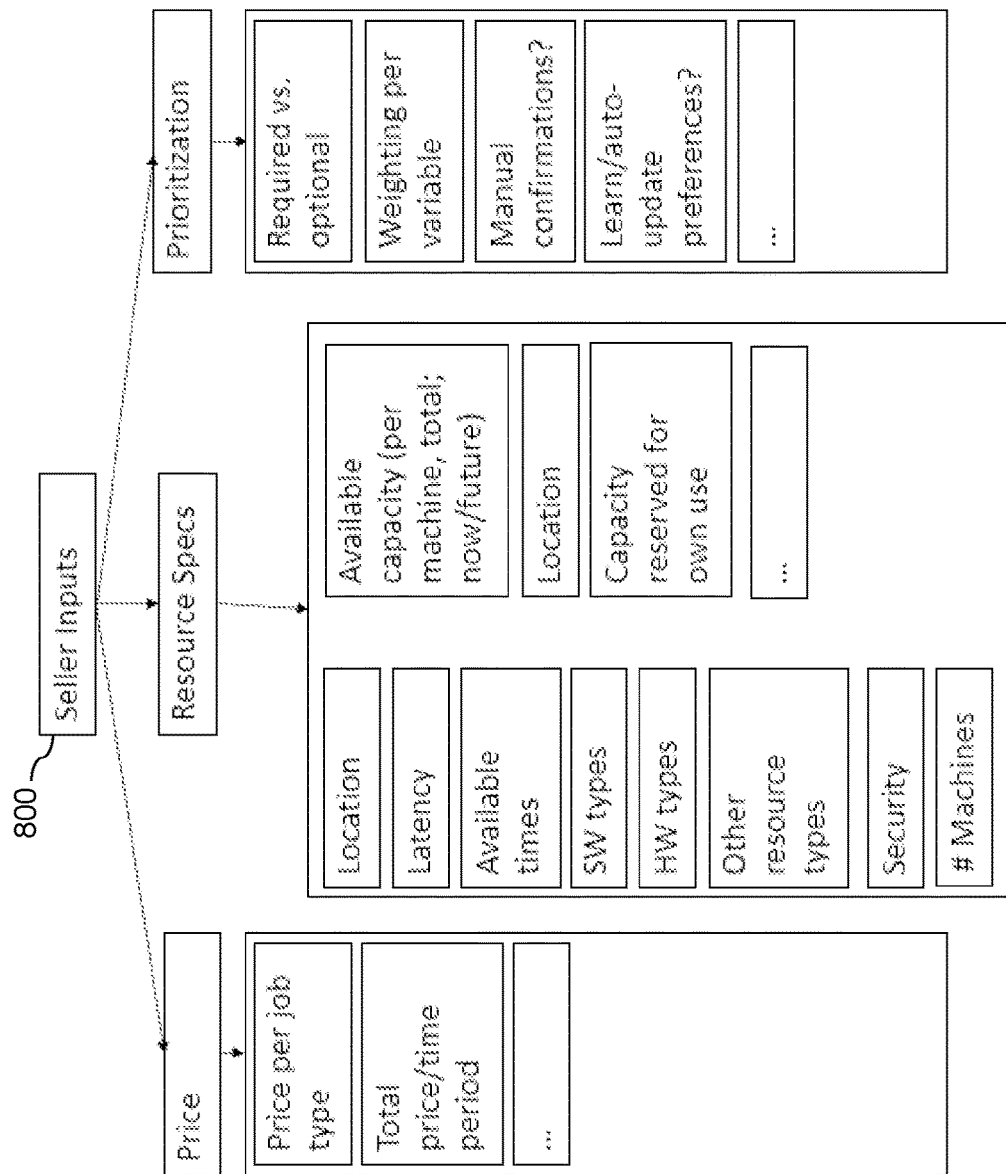

Detailed examples of the above-noted inputs provided by users in the system 100 are described elsewhere herein, such as in conjunction with the illustrative embodiments of FIGS. 7 and 8 which are described in a context in which the first and second users more particularly comprise respective buyers and sellers of edge resource capacity. Numerous other contexts utilizing edge resource aggregation can be supported in the system 100 utilizing the dynamic aggregation techniques disclosed herein.

By way of illustrative example only, the first input for the first user in some embodiments comprises at least one of a trust indicator specifying a trust level for providers of edge resources for executing at least a portion of the workload of that user, and an energy efficiency indicator specifying an energy efficiency level for providers of edge resources for executing at least a portion of the workload of that user. In such an arrangement, the first user can ensure that any provider of edge resources to a pool of dynamically aggregated edge resources that will be used to execute at least a portion of a workload of that user will have at least the requisite trust level and/or energy efficiency level. Additional or alternative indicators of particular user preferences can be provided as part of the first input.

Other users such as the second user that provide edge resources can have their trust level and/or energy efficiency level verified within the system 100, possibly based at least in part on monitoring performed by edge utility meters in the edge computing sites 104 in combination with other verification techniques. It should be noted in this regard that a given user can be both a provider of edge resources to other users as well as an acquirer of edge resources from other user, possibly at different times or under other conditions.

In some embodiments, aggregating edge resources of multiple ones of the edge computing sites 104 into an edge network based at least in part on the populated data structures comprises aggregating edge resources from different edge computing sites 104 at different geographic locations to form the edge network. For example, forming the edge network illustratively comprises forming a first edge network utilizing edge resources from a first set of edge computing sites at respective geographic locations, and forming a second edge network utilizing edge resources from a second set of edge computing sites at respective geographic locations. The first and second edge networks may overlap with one another at one or more of the geographic locations. An example of an edge utility system with multiple overlapping edge networks will be described below in conjunction with FIG. 5.

Additionally or alternatively, aggregating edge resources of multiple ones of the edge computing sites into an edge network based at least in part on the populated data structures illustratively comprises comparing characteristics from the first input for the first user to characteristics from the second input for the second user, and matching one or more edge resources requested by the first user with one or more edge resources available from the second user based at least in part on the comparing. The aggregated edge resources of the edge network illustratively comprise the one or more edge resources available from the second user that match the one or more edge resources requested by the first user.

In some embodiments, the at least one processing device is illustratively configured to monitor at least one edge utility meter for each of one or more edge devices of each of at least a subset of the edge computing sites 104. The edge utility meter is configured to provide metrics measuring utilization of edge resources of its corresponding edge device or set of multiple edge devices.

The edge utility meter in some embodiments is periodically updated in conjunction with execution of at least a portion of the workload of the particular one of the users utilizing aggregated edge resources that include one or more edge resources of its corresponding edge device or set of edge devices.

In some embodiments, each of the edge computing sites is configured to broadcast updates regarding its edge resources to at least one scheduler that controls workload execution utilizing the aggregate edge resources of the edge network. Such a scheduler can be implemented at least in part in one or more instances of the edge resource aggregation logic 110. For example, it can be implemented as a centralized scheduler in the edge resource aggregation logic 110-C of the one or more core computing sites 102, or can be implemented as a distributed scheduler utilizing the instances of edge resource aggregation logic 110-1 through 110-N in the respective edge computing sites 104. Hybrid centralized/distributed arrangements can also be used to implement the scheduler. Other types of controllers referred to herein can be similarly implemented using instances of the edge resource aggregation logic 110.

These and other features and functionality of the system 100 are illustratively implemented at least in part by or under the control of at least a subset of the instances of edge resource aggregation logic 110. The at least one processing device referred to above and elsewhere herein illustratively comprises one or more processing devices that implement respective instances of the edge resource aggregation logic 110.

Although shown as an element of the one or more core computing sites 102 and the edge computing sites 104 in this embodiment, the edge resource aggregation logic 110 in other embodiments can be implemented at least in part externally to the one or more core computing sites 102 and the edge computing sites 104, for example, as a stand-alone server, set of servers or other type of system coupled via one or more networks to the one or more core computing sites 102 and/or the edge computing sites 104. In some embodiments, the edge resource aggregation logic 110 may be implemented at least in part within one or more of the end-user devices 106 and/or in other system components.

The one or more core computing sites 102 and the edge computing sites 104 in the FIG. 1 embodiment are each assumed to be implemented using at least one processing device of at least one processing platform. Each such processing device generally comprises at least one processor and an associated memory, and implements at least a portion of the functionality of the edge resource aggregation logic 110.

It is to be appreciated that the particular arrangement of the one or more core computing sites 102, the edge computing sites 104, the end-user devices 106, the core and edge compute, storage and/or network resources 108 and the edge resource aggregation logic 110 illustrated in the FIG. 1 embodiment is presented by way of example only, and alternative arrangements can be used in other embodiments. As discussed above, for example, the edge resource aggregation logic 110 may be implemented external to one or both of the one or more core computing sites 102 and the edge computing sites 104.

It is also to be understood that the particular set of elements shown in FIG. 1 for dynamic aggregation of edge resources across multiple ones of the edge computing sites 104 utilizing edge resource aggregation logic 110 is presented by way of illustrative example only, and in other embodiments additional or alternative elements may be used. Thus, another embodiment may include additional or alternative systems, devices and other entities, as well as different arrangements of modules and other components.

The one or more core computing sites 102, the edge computing sites 104, the end-user devices 106 and other portions of the system 100, as described above and in further detail below, may be part of cloud infrastructure.

The one or more core computing sites 102, the edge computing sites 104, the end-user devices 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The one or more core computing sites 102, the edge computing sites 104, and the end-user devices 106, or components thereof, may be implemented on respective distinct processing platforms, although numerous other arrangements are possible. For example, in some embodiments, at least portions of the end-user devices 106 and the edge computing sites 104 are implemented on the same processing platform. One or more of the end-user devices 106 can therefore be implemented at least in part within at least one processing platform that implements at least a portion of the edge computing sites 104 and/or the one or more core computing sites 102. Accordingly, in some embodiments, at least a portion of the end-user devices 106 can be coupled to the one or more core computing sites 102, in addition to or in place of being coupled to at least one of the edge computing sites 104.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the one or more core computing sites 102, the edge computing sites 104 and the end-user devices 106, or portions or components thereof, to reside in different data centers. Numerous other distributed implementations are possible.

Additional examples of processing platforms utilized to implement the one or more core computing sites 102, the edge computing sites 104, the end-user devices 106, and possibly additional or alternative components of the system 100 in illustrative embodiments will be described in more detail below in conjunction with FIGS. 15 and 16.

It is to be appreciated that these and other features of illustrative embodiments are presented by way of example only, and should not be construed as limiting in any way.

An exemplary process for dynamic aggregation of edge resources across multiple edge computing sites will now be described in more detail with reference to the flow diagram of FIG. 2. It is to be understood that this particular process is only an example, and that additional or alternative processes for dynamic aggregation of edge resources across multiple edge computing sites may be used in other embodiments.

In this embodiment, the process includes steps 200 through 206. These steps are assumed to be performed by the one or more core computing sites 102 and the edge computing sites 104 utilizing their respective instances of edge resource aggregation logic 110, although it is to be appreciated that other arrangements of edge utility system components can implement this or other similar processes in other embodiments. In some embodiments, the FIG. 2 process more particularly represents an example algorithm performed at least in part by one or more instances of edge resource aggregation logic 110 in system 100.

In step 200, inputs are received for respective users in an edge utility system that includes multiple edge computing sites coupled to one or more core computing sites. The edge utility system may include only a single core computing site, or multiple core computing sites. The edge computing sites are coupled to the one or more core computing sites via one or more networks. The edge computing sites may each comprise one or more edge stations or other types and arrangements of edge nodes. The one or more core computing sites may each comprise one or more data centers or other types and arrangements of core nodes. Each such node or other computing site comprises at least one processing device that includes a processor coupled to a memory. With regard to the received inputs, at least a first one of the inputs for a first one of the users characterizes edge resources requested by that user for executing at least a portion of a workload of that user, and at least a second one of the inputs for a second one of the users characterizes edge resources available from that user for executing at least a portion of a workload of another user. Additional or alternative inputs can be received for these or other users in other embodiments. It should be noted in this regard that each of the first and second users need not have workloads to execute in the edge utility system. For example, in some embodiments, the first user has a workload to execute, but the second user is a supplier who has acquired edge resources from at least a third user, and resells those edge resources for use in executing a workload of a fourth user. Such a supplier is considered an example of a "user" of an edge utility system as that term is broadly used herein.

In step 202, one or more data structures are populated based at least in part on the plurality of inputs received for the respective users in the edge utility system. For example, a separate set of one or more data structures can be populated for each of the first user and the second user. As a more particular example, such data structures can include at least portions of the example data structures shown in FIGS. 7 and 8 for the first user and the second user illustratively acting as a buyer of edge resources and a seller of edge resources, respectively, although terms such as "buyer" and "seller" as used herein in the context of users in an edge utility system are intended to be broadly construed, and should not be viewed as requiring exchange of funds or other types of payments.

In step 204, edge resources of multiple ones of the edge computing sites are aggregated into an edge network based at least in part on the populated data structures. For example, an "edge network" as the term is broadly used herein can include designated edge resources of multiple edge computing sites that are configured to interact with one another to support workload execution for one or more users in the edge utility system.

In step 206, at least a portion of the aggregated edge resources of the edge network are utilized to execute at least a portion of a workload of a particular one of the users. For example, at least a portion of the aggregated edge resources made available by the second user acting as a seller of edge resources may be utilized to execute at least a portion of a workload of the first user acting as a buyer of edge resources. A wide variety of other workload execution arrangements utilizing aggregated edge resources can be additionally or alternatively implemented in illustrative embodiments herein. The term "workload" as used herein is intended to be broadly construed so as to encompass, for example, one or more applications that are executed at least in part utilizing aggregated edge resources.

Figure 2:
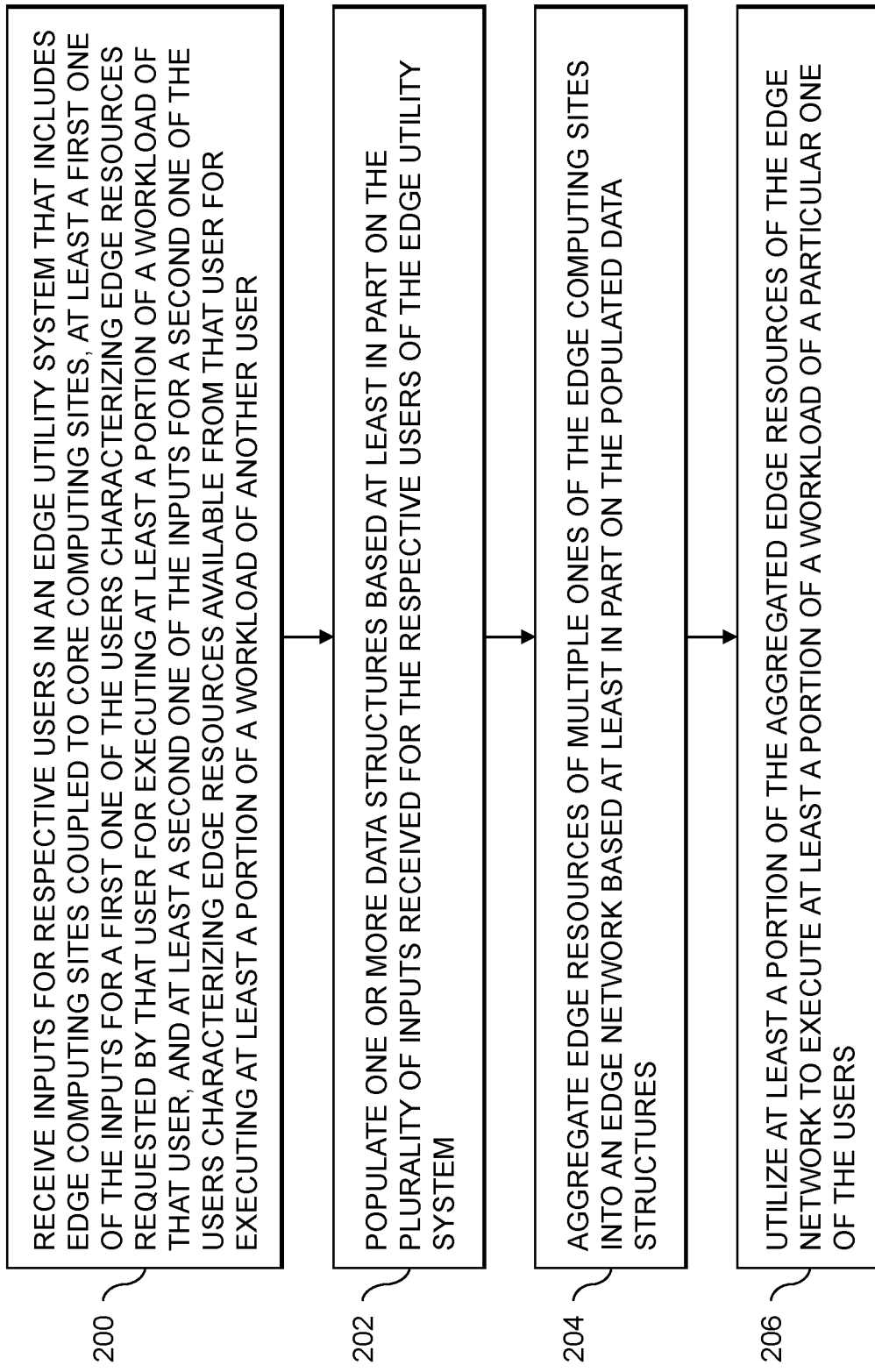
FIG. 2 is a flow diagram of an exemplary process for dynamic aggregation of edge resources across multiple edge computing sites in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving core computing sites, edge computing sites and functionality for dynamic aggregation of edge resources across multiple edge computing sites. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different aggregated arrangements of edge resources within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments will now be described with reference to FIGS. 3 through 9. In these embodiments, users including the above-noted first and second users are more particularly referred to as examples of respective "buyers" and "sellers" of edge resources, although those terms are intended to be broadly construed herein, and should not be viewed as requiring particular features such as exchange of funds. References herein to buyers and sellers can be more generally understood to refer to respective resource-acquiring users and resource-providing users, with respect to acquiring or providing edge resources for execution of workloads on behalf of a given such user or other system users.

As indicated previously, in some embodiments, the one or more core computing sites 102 are implemented using cloud infrastructure. Cloud computing provides a number of advantages, including but not limited to playing a significant role in making optimal decisions while offering the benefits of scalability and reduced cost. Edge computing implemented using the edge computing sites 104 provides another option, typically offering faster response time and increased data security relative to cloud computing. Rather than constantly delivering data back to one or more of the core computing sites 102, which may be implemented as or within a cloud data center, edge computing enables devices running at the edge computing sites 104 to gather and process data in real-time, allowing them to respond faster and more effectively. The edge computing sites 104 in some embodiments interact with the one or more core computing sites 102 implemented as or within a software-defined data center (SDDC), a virtual data center (VDC), or other similar dynamically-configurable arrangement, where real-time adjustment thereof based on workload demand at edge computing sites 104 is desired.

By incorporating edge computing with centralized cloud computing, an entity can maximize the potential of both approaches while minimizing their limitations. Finding the right balance between edge and cloud computing, however, is a major issue for entities that utilize hybrid edge and cloud computing environments.

Different edge computing sites may have different amounts of resources (e.g., compute, storage and network resources). Further, even if two edge computing sites have the same resources, they may have different associated workload status at different points in time depending on real-time data processing streams.

Edge computing sites typically have limited compute and storage resources as compared to a core computing site (e.g., a cloud data center). End-users may want applications to be suitably distributed between the edge computing sites and the core computing site on demand to maximize the resources of the edge computing sites.

A technical problem that arises in some conventional arrangements is that such arrangements fail to provide a sufficiently efficient and flexible solution to meeting demands of variable workloads from a potentially large number of users. In addition, users that may have available edge resources are often unable to make those resources readily accessible for utilization by workloads of other users.

Illustrative embodiments disclosed herein allow edge users to find each other to buy and sell capacity (e.g., compute accelerators, storage devices, network bandwidth, etc.) based on personalized requirements (e.g., not just based on price). Such embodiments enable a system of buying and selling based on factors other than the highest bid, thereby ensuring that buyers with fewer resources are not locked out of the market. It also allows users to focus on other, non-financial preferences (e.g., location, speed, power consumption, trust, energy efficiency, etc.)

Many edge users have excess edge capacity (e.g., compute accelerators, storage devices, network bandwidth, etc.) or need excess edge capacity. Some embodiments herein enable users to buy and sell excess edge capacity through a coordinated marketplace, thereby effectively providing an edge utility as a service. Such arrangements open up access to buyers who are not necessarily the highest bidder in an auction sense, and enable buyers and sellers to input purchase/sales preferences based on factors other than cost.

The edge utility market provides the ability of infrastructure providers (e.g., ideally at edge locations) to join a dynamic pool of available resources to facilitate a network of aggregated edge computing capability. This edge network will grow (and potentially shrink, although that would typically be less likely) as more providers join the pool of edge resources. Collectively, the resources of these providers will be aggregated based on location and/or other factors and made available to edge application developers based on a well-defined set of criteria.

Illustrative embodiments disclosed herein enable users to define and configure energy efficiency requirements and other preferences for edge utility transactions in an edge utility market and in other system contexts. Such an arrangement also enables automatic generation of energy efficiency and environmental impact ratings, as well as other related information characterizing edge resource deployments.

Figure 3:
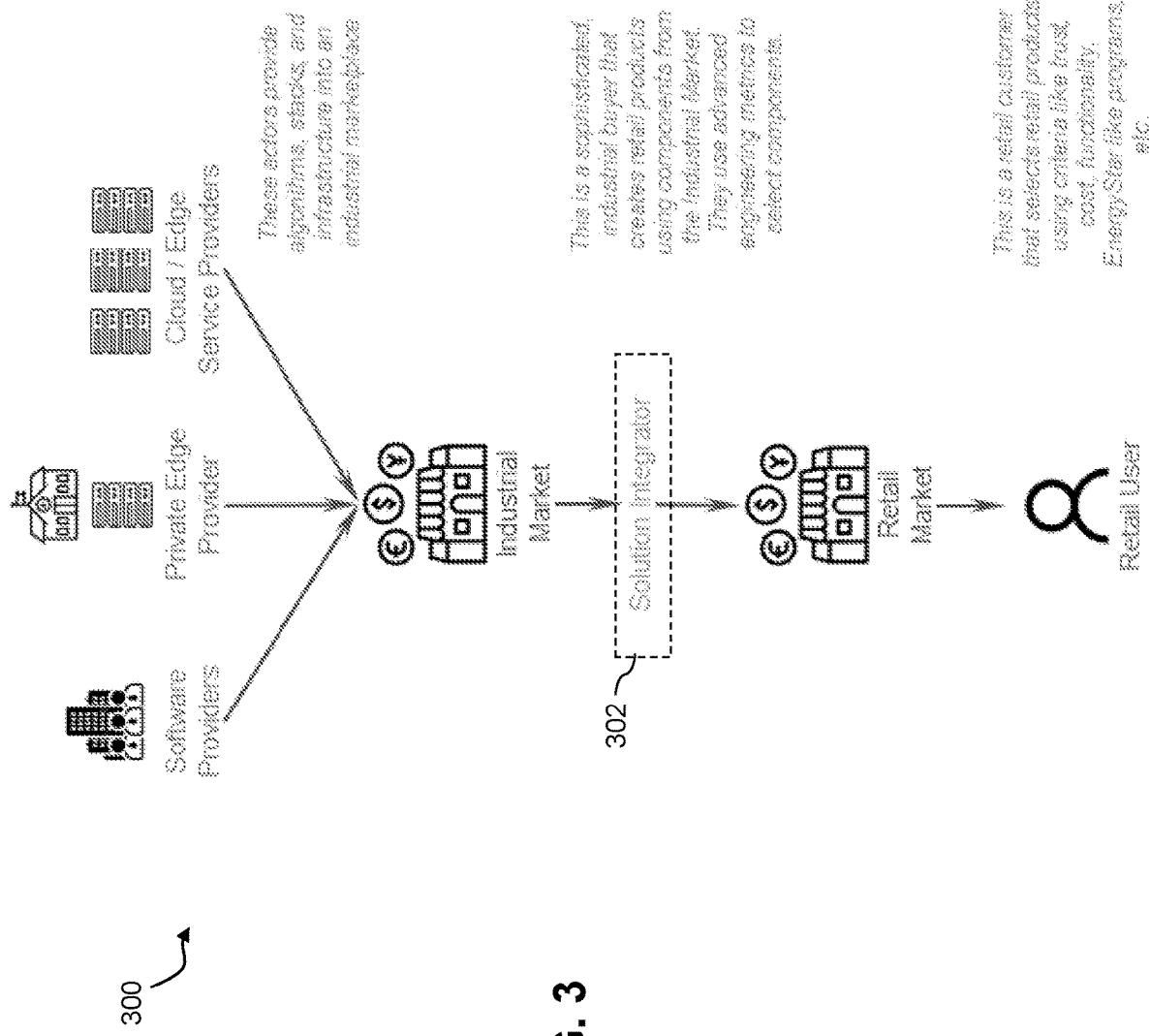
FIG. 3 shows example persona relationships among multiple distinct participants in an edge utility system in an illustrative embodiment.

FIG. 3 depicts example system entities of an illustrative edge utility system 300 and shows the interactions and ownership boundaries between such entities in the edge utility system 300. It is to be appreciated that the particular system entities illustrated in this figure are presented by way of example only, and additional or alternative parties or other entities may be part of edge utility system 300 or other edge utility systems in other embodiments. Such system entities include examples of various types of "users" of an edge utility system. A given such user illustratively has at least one corresponding persona corresponding to its entity type, although a given user can have multiple such personas, for example, at different times and/or sequentially. Additional or alternative users can be present in other embodiments, and the term "user" is intended to be broadly construed herein.

The users in the edge utility system 300 in this embodiment include software providers, private edge providers, cloud service providers and edge service providers, the latter service providers being collectively referred to as cloud/edge service providers. The software providers, private edge providers and cloud/edge service providers illustratively provide algorithms, stacks and infrastructure into an industrial market.

The software providers illustratively develop and deploy software that could be utilized by end-users. The software providers may provide components into the industrial market and/or serve as vendors in a retail market that interacts with retail users.

The private edge providers illustratively have hardware in their private domains for their own use cases. Some examples include homeowners, school administrators, IT departments in businesses or other enterprises, etc. In some embodiments, the private edge providers provide edge infrastructure into the industrial market.

The cloud service providers and edge service providers illustratively interact with the industrial market. For example, cloud service providers can provide PaaS, IaaS, FaaS and/or STaaS offerings from their respective datacenters.

The industrial market provides space to match buyers with sellers and/or resellers of edge infrastructure. This could be either an auction house type of organization, or more like a utility provider where there is a default to a certain price (e.g., based on regulations, demand, etc.) In some cases, the edge utility market is a reseller (e.g., purchasing—or already owning—the resources and reselling them). In other cases, it serves as an edge resource matchmaker, without ever owning the resources.

The example parties above interact in the industrial market, undergoing a matchmaking process based on their requirements, buyer preferences, and local laws and regulations.

The industrial market may be viewed as an example of what is more generally referred to herein as an "edge utility market." As indicated previously, such a market illustratively provides the ability of infrastructure providers (e.g., at edge locations) to join a dynamic pool of available resources to facilitate a network of aggregated edge computing capability, where the pool can grow dynamically over time as more providers join the pool of edge resources. Collectively, the resources of these providers will be aggregated based on location and/or other factors and made available to edge application developers based on a well-defined set of criteria.

This autonomous, growing, self-configuring pool of edge resources in illustrative embodiments disclosed herein is orchestrated and regulated by one or more solution integrators 302. Value grows as the networks of edge resource pools grow autonomously, with their usage by edge application providers driven by their aggregated value as a utility, similar to the energy utility grid.

The solution integrators 302 are illustratively sophisticated, industrial buyers that create retail products using components from the industrial market. They use advanced engineering metrics to select components. They select edge services and match such services with software to create retail products for retail users. These services and software can run on a wide variety of different types of infrastructure, and are configured to provide an improved user experience for corresponding end-users. In some embodiments, the solution integrators 302 are potential buyers of edge infrastructure.

The retail market is where retail customers can select retail products using criteria such as trust, cost, functionality, EnergyStar-like programs, etc. It is possible for a particular user to operate as more than one entity type within the edge utility system, at the same time and/or sequentially.

In some embodiments, sellers sell to buyers, with the industrial market or other edge utility market acting as an edge resource matchmaker. For example, producers illustratively sell to the edge utility market, which sells to buyers. In some embodiments, producers and the edge utility market are the same entity.

The edge utility system illustratively comprises an edge utility marketplace and may specialize in a particular purchasing decision philosophy (e.g., prioritizing energy efficiency or trust) or in multiple distinct philosophies at the same time. The edge utility system can also specialize in one or more types of resources (e.g., compute accelerators, storage devices, network bandwidth, etc.)

The edge utility market is responsible for connecting buyers and sellers. In some embodiments, this can include one or more of the following:

1. Matching buyers with sellers based on one or many potential variables (e.g., cost, latency, energy efficiency, trust, etc.) The number of variables and importance/weighting of each can vary based on the implementation.
2. Purchasing from sellers and reselling to buyers.
3. Enabling access to purchased resources (e.g., via APIs).
4. Verifying metering logs. For example, this can involve serving as a neutral third party between two users (e.g., buyers/sellers, producers/consumers or other types of users), or in cases where there is a conflict of interest (e.g., one party is a provider and a reseller), providing a neutral third party for metering verification.
5. Ensuring payments are made.
6. Setting prices in different regions (e.g., if regulations require doing so).
7. Calculating and displaying the current/future price of edge infrastructure.

Buyers can include, for example, groups such as application developers/owners, PaaS providers, IaaS providers, FaaS providers, STaaS providers, etc.

Sellers can include, for example, edge resource owners such as owners of edge devices (e.g., servers, computers, tablets, etc.) with excess compute capacity, accelerators, virtual machines, etc.

Once the edge utility market receives a request to buy or sell, the request goes into a queue in the edge utility system, where it is auto-sorted based on factors such as order of arrival in the queue, availability of resources, ability for the request to be split across various devices, and the user's preferences for how to prioritize bids.

Illustrative embodiments provide a flexible architecture that can add different priority areas for buying/selling. For example, some buyers/sellers may prioritize buying/selling from edge devices that are energy efficient, enable purchase of blocks of capacity in advance, or have high levels of trust (among other options). In determining who to buy from/sell to, users can be notified when a new option for prioritization becomes available.

In some embodiments, an edge utility marketplace comprises multiple levels, such as n tiers arranged in a hierarchy. For example, a local controller can handle information on behalf of its network devices (e.g., share the rollups on behalf of them all so each individual device does not need to deal directly with the centralized marketplace).

If a user wants to connect to more than one edge utility market, a corresponding setting is implemented such that other edge utility markets know what is already being bought/sold so there is no accidental double-buying/selling.

The marketplace can be divided into regions, each having different rates specified for one or more variables.

The resources being bought and sold can be actual resources, or credits for future resource availability.

Figure 4:
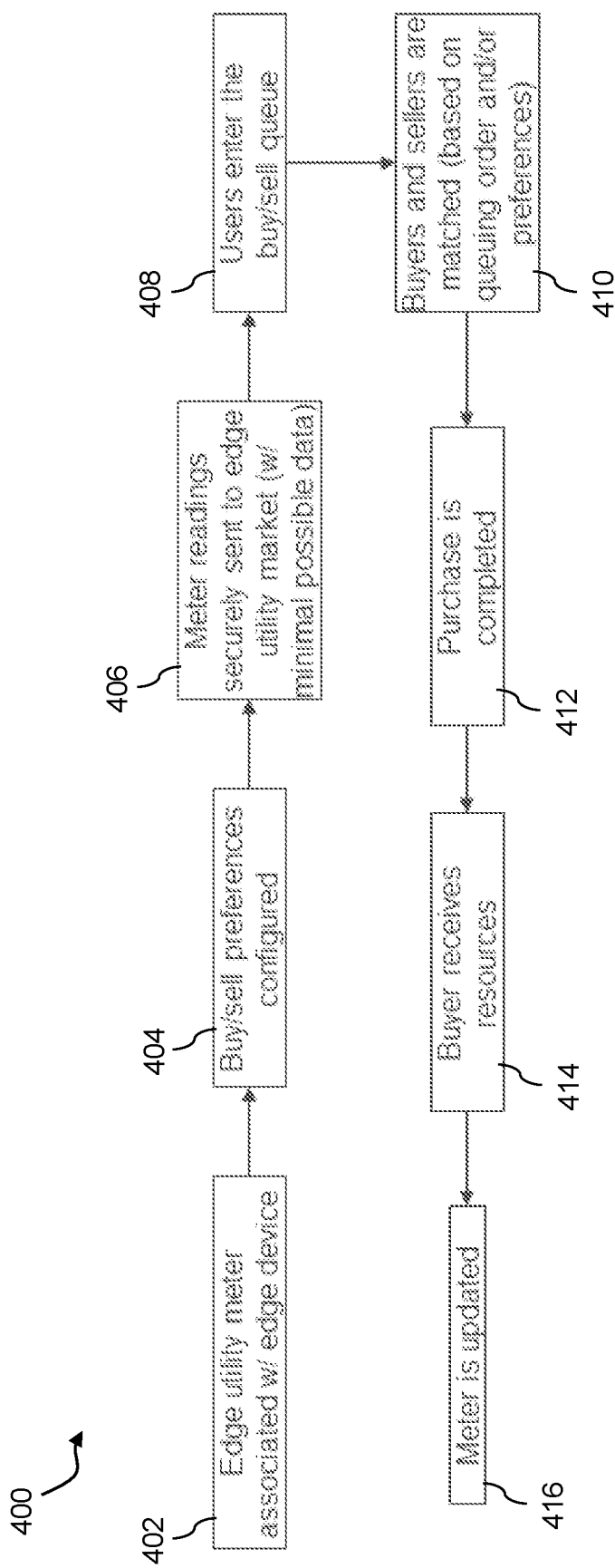
FIG. 4 shows example interactions between participants in an edge utility system in an illustrative embodiment.

FIG. 4 shows example interactions between participants in an edge utility system 400 in an illustrative embodiment. In this embodiment, an edge utility meter 402 is associated with an edge device of an edge computing site of a particular user. Similar edge utility meters are assumed to be associated with other edge devices of this user, and with edge devices of other users, including users in other edge computing sites. In some embodiments, such an arrangement can be used to allow users to share data across their own devices, although numerous other data sharing arrangements are supported using the disclosed techniques.

As shown at 404, buy/sell preferences are configured for the particular user, and as shown at 406, meter readings are securely sent to an edge utility market implemented by the edge utility system 400, illustratively using the minimal possible amount of user data. Users enter a buy/sell queue of the edge utility system 400, as shown at 408. The buyers and sellers are matched at 410 based on queuing order and/or their configured preferences. A purchase of matching edge resources is completed at 412, and the buyer receives the resources (e.g., obtains access to those resources for use in executing a workload of the buyer) at 414. One or more edge utility meters are updated as appropriate as indicated at 416.

Figure 5:
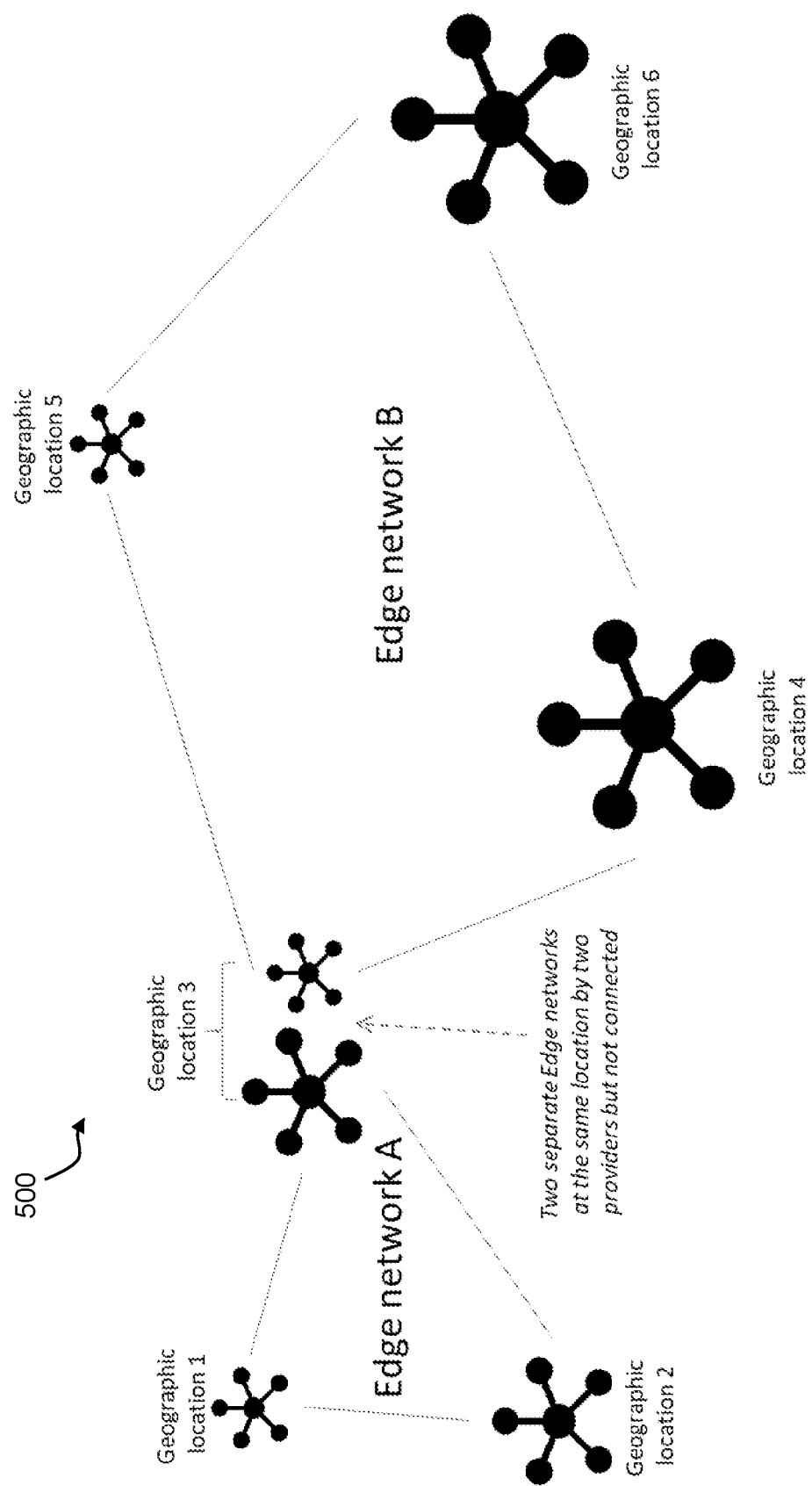
FIG. 5 shows multiple edge networks generated by aggregating edge resources at different geographic locations in an illustrative embodiment.

FIG. 5 depicts an energy utility system 500 in which multiple edge utility markets exist at least in part within the same geographic location. This is an example of an embodiment in which aggregating edge resources of multiple edge computing sites into an edge network comprises aggregating edge resources from different edge computing sites at different geographic locations to form the edge network. More particularly, in this example, a first edge network denoted as Edge Network A is formed utilizing edge resources from a first set of edge computing sites at respective geographic locations 1, 2 and 3, and a second edge network denoted as Edge Network B is formed utilizing edge resources from a second set of edge computing sites at respective geographic locations 3, 4, 5 and 6.

It can be seen that in this embodiment, the two separate edge networks overlap one another at geographic location 3, utilizing two different edge resource providers that are associated with that same geographic location but are not otherwise connected.

In these and other embodiments, a given user can sell or otherwise provide edge resources to more than one edge utility system.

Also, in these and other embodiments, users can switch back and forth between buying and selling, based on how close they get to certain thresholds (which can be preconfigured). A given user can also manually stop buying/selling if need be.

It is possible to be both a buyer and a seller at the same time, such as for different types of resources (e.g., compute accelerators, storage devices, network bandwidth, etc.)

The user can also choose to buy at certain prices and sell at certain prices (so they can be both buyers and sellers of capacity at different prices).

Buyers can look for resources over a longer period of time (e.g., a week or a month) in addition to real-time.

Sellers can charge more at different times, based on factors such as time period (e.g., time of day or season) or their own application status.

The purchase can include actual deployment capacity or future deployment capacity. It can also be at a set or variable price (e.g., at the moment of the transaction, or at the price when the actual exchange occurs).

The purchase can also include expansion capacity, which in some embodiments can be automatically resold or otherwise transferred if it is not used at the designated time.

In order to avoid unexpected work stoppages, users can preconfigure preferences for what to do when the price goes above their pre-set limit.

As indicated previously, in some embodiments, a meter assigned to an edge device is configured to communicate with an edge utility market (e.g., via a user's edge utility market profile; the user could be prompted to select an edge utility market provider in conjunction with configuration of the meter). The meter can be located on the user's physical device or somewhere else such as, for example, in the cloud or on another edge device.

The meter in some embodiments is configured to capture, store and emit metadata regarding the current status of a corresponding local edge device. For example, it can leverage techniques disclosed in U.S. patent application Ser. No. 17/451,782, filed Oct. 21, 2021 and entitled "Use of IO Event Metadata to Enable XaaS Billing and Analytics," which is incorporated by reference herein its entirety. Additionally or alternatively, such metadata can relate to accelerators, trust factors, energy efficiency, or any other information type. In some embodiments herein, the metadata is provided by the meter to one or more processing devices implementing an edge utility market.

Another possible way of validating the actual capacity is to require the user to install software that audits their availability, and/or whether they are selling to any other edge utility markets.

In some embodiments, portions of captured information can be obscured or redacted for security purposes.

Users can also configure their meters to capture, store and emit only the relevant metadata related to their buy/sell preferences (e.g., if they are only interested in buying based on certain characteristics in the supplier's configuration).

There can also be limits to how this information interacts with the supplier's machine and/or software. For example, it could be made available to the edge network provider, and/or to the edge utility market, but not to the device owner.

Figure 6:
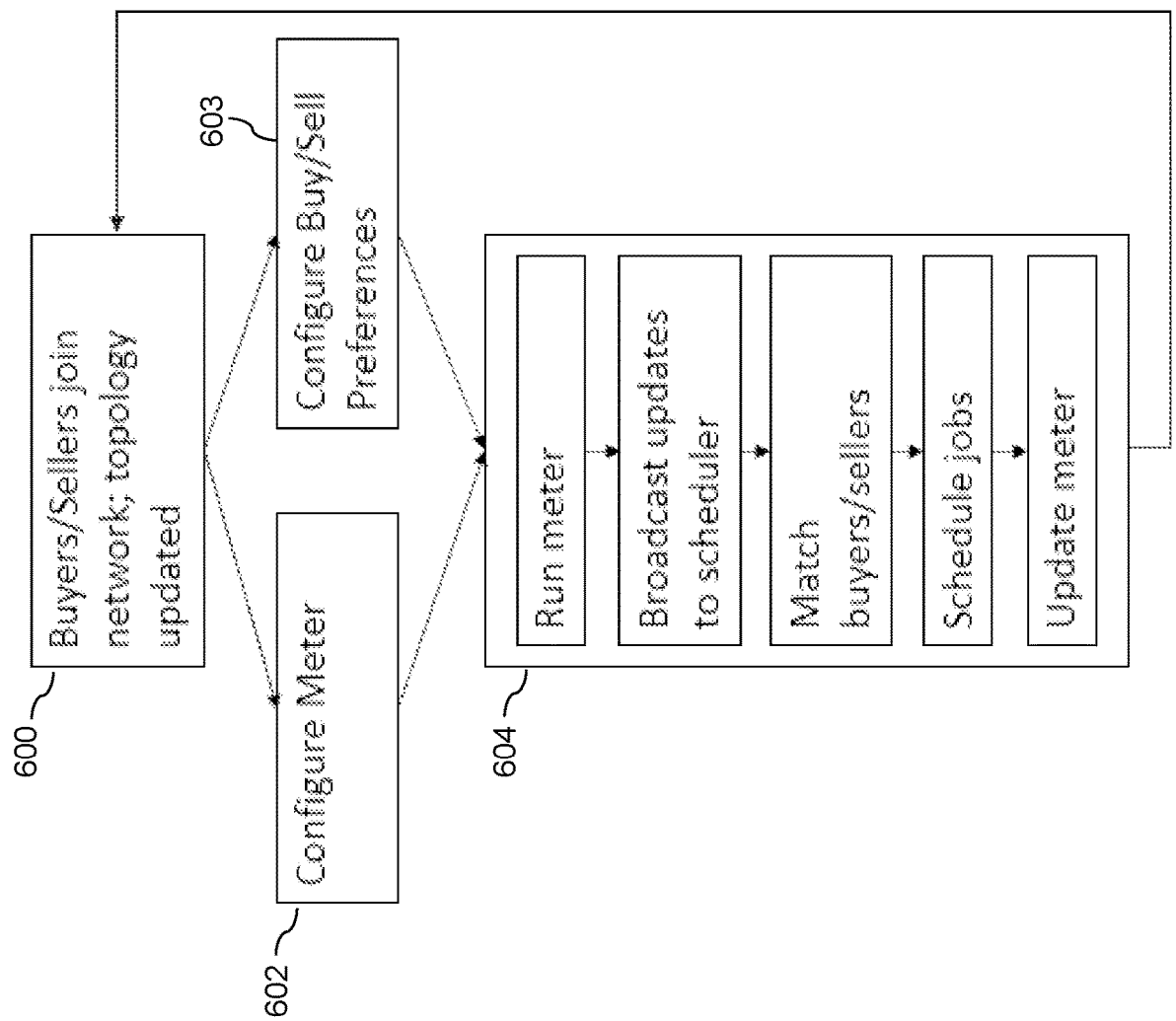
FIG. 6 is a flow diagram of an exemplary process for implementing an edge utility system using dynamic aggregation of edge resources across multiple edge computing sites in an illustrative embodiment.

FIG. 6 depicts an example process implemented in an edge utility system in an illustrative embodiment.

In step 600, buyers and sellers join the network, and the topology is updated. Such users can also leave the network at a subsequent time. In some cases, for example, this step may be implemented at least in part by having each joining user complete a profile and/or take other actions such as downloading software into an end-user device. Additionally or alternatively, it may be done by a local/corporate network.

In step 602, the meter is configured for each joining user. There can be multiple meters associated with each joining user, such as one meter for each edge device associated with that user, although numerous other metering arrangements are possible.

In step 603, the buy/sell preferences are configured for each joining user.

The configurations in steps 602 and 603 are illustratively performed at least in part by an end-user, and/or by an administrator.

In portion 604 of the FIG. 6 process, additional operations are performed, as follows. The one or more meters run for each user in the network, and broadcast updates to a scheduler of the edge utility system. The edge utility system then matches buyers and sellers. In some embodiments, where the edge utility market buys resources directly (or already owns them), this step would be replaced with matching buyers directly to available resources. Jobs are then scheduled, according to preferences and priorities as described elsewhere herein. As the scheduled jobs are run, booked or otherwise processed, the one or more meters are updated for each corresponding user.

After completion of the operations of portion 604, the process returns to step 600 as indicated. The topology can be checked regularly for buyers/sellers who have joined or left the network, and adjusted accordingly. Multiple instances of portion 604 can be performed sequentially or at least in part in parallel with one another, for different groups of users, different networks, etc.

FIG. 7 shows a number of examples of potential buyer inputs 700. The illustrated arrangement, or particular portions thereof, are considered examples of "data structures" as that term is broadly used herein. Accordingly, the buyer inputs 700 are illustratively captured and stored in one or more data structures. Additional or alternative inputs can be used in other embodiments. Buyers have the option to input one or more of several categories of requirements, as illustrated in the figure, including the following:

1. Budget. Examples include the budget per job type and the total budget per time period.
2. Resource Specifications ("Specs"). This illustratively includes job requirements, such as location, latency, completion time frame, software and/or hardware type, availability, and security requirements, and job preferences, such as the number of machines a job can be split across, detailed hardware and software types, location, completion time frame, and availability
3. Additional preferences. Examples include trust, clean energy usage, power consumption, low income assistance, user satisfaction ratings, and how long a seller agrees to maintain their status post-purchase (e.g., they commit to holding their power consumptions specs steady for the duration of the job or another specified period). Buyers can also specify weights for each preference. In some embodiments, the edge utility system can provide visibility into progress towards limits. For example, a user could be alerted and provided with an opportunity to change preferences or take other actions as limits are reached. Additionally or alternatively, one or more such actions can be taken automatically.
4. Prioritization. Examples include whether a feature is required versus optional, the weighting for each variable, whether manual confirmations will be required, and whether the user would like to leverage automated decision making.

Depending on the implementation, buyer inputs can be determined automatically based on prior user inputs, and/or based on historical data from other similar users.

Buyers can update their preferences regularly.

If the buyer does not specify any preferences, the preferences may be defaulted to certain settings depending on the implementation.

FIG. 8 shows a number of examples of potential seller inputs 800. The illustrated arrangement, or particular portions thereof, are also considered examples of "data structures" as that term is broadly used herein. Accordingly, the seller inputs 800 are illustratively captured and stored in one or more data structures. Again, additional or alternative inputs can be used in other embodiments.

Sellers also have the option to input one or more of several categories of requirements, as illustrated in the figure, including the following:

1. Price. Examples include the price per job and the total price per time.
2. Resource Specs. Examples include seller location, ability to meet buyer latency requirements, available times, software and hardware types, other resource types, ability to meet buyer security requirements, number of machines available, available capacity (per machine, total; now/future), and the amount of capacity reserved for the seller's own use.
3. Prioritization. Examples include whether buyer resource specs are required versus optional, the weighting per variable, whether manual confirmations are required, and whether the seller will enable auto updating of their preferences. There can also be a flag for high-priority jobs, such as helping to find missing people in a disaster.

Depending on the implementation, seller inputs can be determined automatically based on prior user inputs, and/or based on historical data from other similar users.

Sellers can update their preferences regularly.

If the seller does not specify any preferences, the preferences may be defaulted to certain settings depending on the implementation.

In some cases, the price will be automatically determined by the utility and/or by supply and demand.

Figure 9:
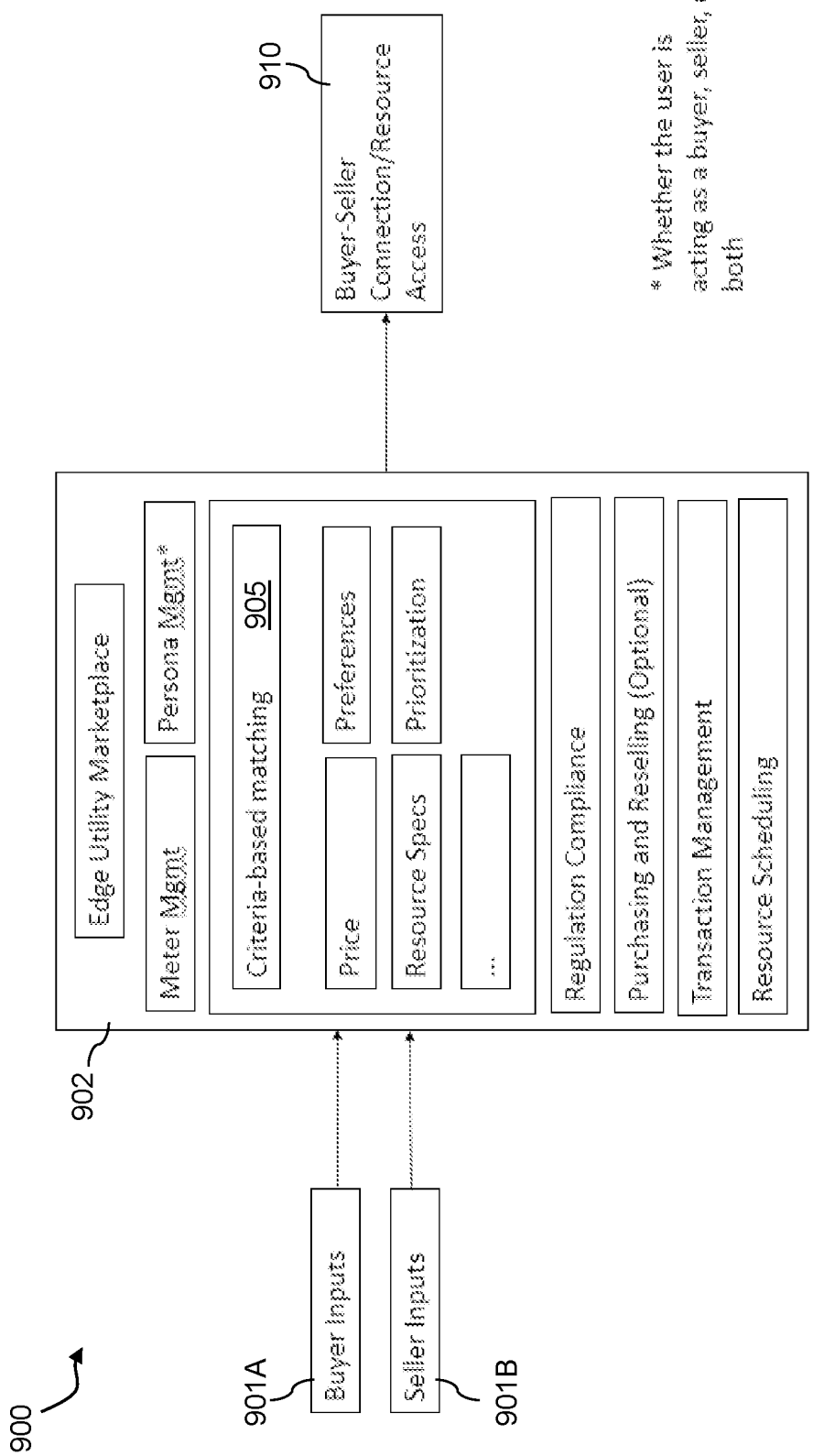
FIG. 9 is a block diagram of an edge utility system in an illustrative embodiment.

FIG. 9 shows an example edge utility system 900 in another illustrative embodiment. In this embodiment, the edge utility system 900 implements an edge utility marketplace 902 using one or more processing platforms each comprising one or more processing devices. The edge utility marketplace 902 receives user inputs 901 that more particularly include buyer inputs 901A and seller inputs 901B.

The edge utility marketplace 902 implements a criteria-based matching process 905 utilizing factors such as price, resource specs, preferences, prioritization, etc. as described in more detail elsewhere herein. Responsive to one or more results of a given instance of the criteria-based matching process 905, one or more buyer-seller connections are made and edge resource access is provided, as indicated at 910.

In some embodiments, price-related matching aspects of the criteria-based matching process 905 can be based at least in part on one or more techniques disclosed in U.S. patent application Ser. No. 16/885,476, filed May 28, 2020 and entitled "Private Edge-Station Auction House," which is incorporated by reference herein in its entirety.

The edge utility marketplace 902 in the present embodiment is more particularly configured to provide the following functionality:

1. Meter management. For example, ensuring that all users have meters installed and running.
2. Persona management. For example, determining whether a given user is or should be acting as a buyer, a seller, or both. This also includes complex situations when this status is regularly changing for one or more users.
3. Matching. This is performed based on buyer and seller inputs 901 applied to the criteria-based matching process 905.
4. Regulation compliance. For example, limiting the maximum price or requiring a minimum amount of energy efficiency compliance.
5. Purchasing and reselling. This functionality is illustratively denoted as optional in this particular embodiment, but such a notation herein should not be viewed as an indication that other components or features are required.
6. Transaction management. This can involve, for example, using technologies such as distributed ledgers, blockchains and/or smart contracts to capture immutable billing, to facilitate reseller markets, and to provide other types of secure processing. As a more particular example, this may include validating the purchase of a certain amount of computation on a certain type of edge resource (e.g., two hours of compute on a certain type of edge processor).

7. Resource scheduling. This includes scheduling jobs or other types of workloads for execution using aggregated edge resources.

The criteria-based matching process 905 in some embodiments is implemented utilizing a search-based algorithm with different preference and prioritization variables as a heuristic function. In the case when none of the available edge resources can fully satisfy all of the specified requirements for both buyer and seller, the buyer and seller with the highest heuristic score may be considered a match, unless either buyer or seller has indicated that all specified requirements need to be met.

When cost is the only factor whose requirements cannot be met, dynamic price adjustments can be made based on user's specification to increase prices for higher-demand resources (e.g., subject to regulations, and with restrictions to ban price gauging) or to decrease prices for under-demand resources. For example, buyers and sellers can both provide their highest and lowest prices (or these can be inferred based on historical data), and prices can be adjusted slightly until a match is achieved.

After a given instance of the criteria-based matching process 905 is complete, the edge utility marketplace 902 can also facilitate the buyer-seller connection and resource access, for example, through one or more APIs. In some cases, it will simply connect buyers and sellers; in other cases, the edge utility marketplace 902 will actually purchase the resources and resell them to buyers.

Additional illustrative embodiments of edge utility systems will now be described with reference to FIGS. 10 and 11. These embodiments provide examples of edge utility systems with distributed ledger verification for dynamic aggregation of edge resources.

Figure 10:
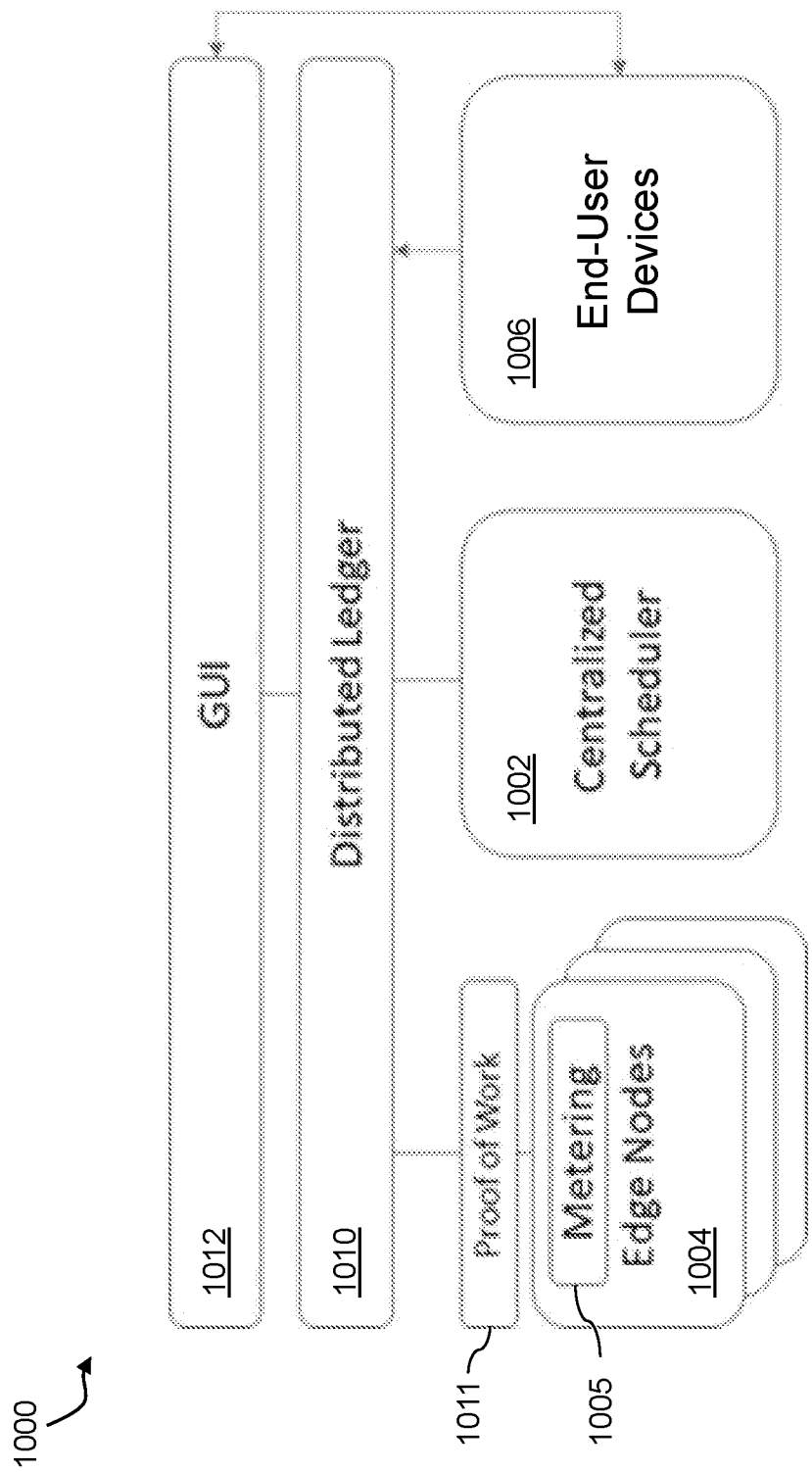
FIG. 10 is a block diagram of an edge utility system with distributed ledger verification for dynamic aggregation of edge resources in an illustrative embodiment.

FIG. 10 shows an edge utility system 1000 with distributed ledger verification for dynamic aggregation of edge resources in an illustrative embodiment. The edge utility system 1000 in this embodiment comprises a centralized scheduler 1002 and a plurality of edge nodes 1004 each equipped with metering logic 1005. Such metering logic 1005 illustratively comprises individual edge utility meters implemented on each of a plurality of edge devices within each of the edge nodes 1004, although other types and arrangements of metering logic 1005 may be used in other embodiments.

The edge nodes 1004 are examples of what are more generally referred to herein as "edge computing sites," and it is to be appreciated that other types and arrangements of edge computing sites can be used in other embodiments. For example, a given edge computing site in other embodiments can comprise multiple edge nodes, with each such edge node comprising one or more edge devices.

The centralized scheduler 1002 is responsible for aggregating edge resources of the edge nodes by matching buyers or other acquirers of edge resources with sellers or other providers of edge resources, and for scheduling execution of workloads for one or more users on the aggregated edge resources. The centralized scheduler 1002 in some embodiments is implemented as at least a portion of one or more core computing sites, such as the one or more core computing sites 102 of system 100 in FIG. 1, although other types and arrangements of one or more processing devices can be utilized to implement centralized scheduler 1002 in other embodiments. For example, in some embodiments, the centralized scheduler 1002 can be implemented as one or more servers or other types of computers accessible to the edge nodes 1004 over at least one network. It is also possible in some embodiments for at least portions of the aggregation and scheduling functionality of the centralized scheduler 1002 to be distributed over other system components, such as one or more of the edge nodes 1004.

It should be noted that, in these and other embodiments comprising controllers, schedulers and/or other similar components associated with edge nodes or other edge computing sites, at least portions of such components may be arranged in the form of n tiers of coordinated controllers, schedulers and/or other similar components, as described elsewhere herein.

The edge utility system 1000 further comprises a plurality of end-user devices 1006, a distributed ledger 1010 and a graphical user interface (GUI) 1012. The centralized scheduler 1002, edge nodes 1004 and end-user devices 1006 can each access the distributed ledger 1010 as illustrated. For example, the edge nodes 1004 illustratively provide proof of work 1011 or other information characterizing their edge resources and the utilization thereof in executing workloads in the edge utility system 1000. The end-user devices 1006 illustratively also have access to the distributed ledger 1010 via the GUI 1012. The GUI 1012 is configured to facilitate the utilization of the edge utility system 1000 by system users associated with respective ones of the end-user devices 1006.

The distributed ledger 1010 illustratively comprises a public or private blockchain, or combinations of multiple such blockchains, and may additionally or alternatively implement aspects of smart contracts relating to aggregation of edge resources of the edge nodes 1004 in the edge utility system 1000.

In the FIG. 10 embodiment, the edge utility system 1000 implements verification for dynamic aggregation of edge resources of the edge nodes 1004 via the distributed ledger 1010. For example, proof of work 1011 or other information characterizing the utilization of edge resources of the edge nodes 1004 can be captured as respective blocks that are appended to a blockchain of the distributed ledger 1010.

An exemplary process implementing distributed ledger verification for dynamic aggregation of edge resources will now be described in more detail with reference to the flow diagram of FIG. 11. It is to be understood that this particular process is only an example, and that additional or alternative processes utilizing a distributed ledger in conjunction with dynamic aggregation of edge resources across multiple edge computing sites may be used in other embodiments.

In this embodiment, the process includes steps 1100 through 1106. These steps are assumed to be performed by the edge utility system 1000 comprising centralized scheduler 1002, edge nodes 1004, end-user devices 1006, distributed ledger 1010 and GUI 1012, although it is to be appreciated that other arrangements of edge utility system components can implement this or other similar processes in other embodiments. In some embodiments, the FIG. 11 process more particularly represents an example algorithm performed at least in part by one or more instances of edge resource aggregation logic 110 in system 100 of FIG. 1.

In step 1100, edge resources of a plurality of edge computing sites of an edge utility system are aggregated in the manner described elsewhere herein, with the aggregated edge resources including edge resources provided by at least one user of the edge utility system for utilization by one or more other users of the edge utility system. In some embodiments, each of at least a subset of the edge computing sites of the edge utility system comprises a plurality of edge devices and at least one edge utility meter configured to meter the utilization of edge resources of the edge devices of that edge computing site by one or more of the users in the edge utility system. As indicated previously, the edge resources of each of at least a subset of the edge computing sites of the edge utility system illustratively comprise at least one of compute, storage and network resources of a plurality of edge devices of that edge computing site.

In aggregating edge resources, matching processes of the type described elsewhere herein are performed. For example, aggregating edge resources of the edge computing sites of the edge utility system illustratively comprises matching one or more edge resources requested by a first user with one or more edge resources available from a second user, with the aggregated edge resources comprising the one or more edge resources available from the second user that match the one or more edge resources requested by the first user.

The aggregation of edge resources in some embodiments is performed at least in part utilizing a centralized scheduler configured to access the edge computing sites and a distributed ledger via at least one network. The centralized scheduler in some embodiments can be implemented in a data center of a core computing site, although numerous alternative implementations are possible.

In step 1102, one or more portions of the aggregated edge resources are utilized to execute one or more workloads of the one or more other users. As indicated previously, such workloads of one or more users can comprise, for example, one or more applications, portions of one or more applications, or other types and arrangements of executable program code, where the term "application" is intended to be broadly construed so as to encompass, for example, microservices and other types of services implemented in software executed by the edge nodes 1004 of the edge utility system 1000.

In step 1104, the utilization of the one or more portions of the aggregated edge resources in conjunction with the execution of the one or more workloads is metered. Such metering is illustratively performed by the metering logic 1005 of respective ones of the edge nodes 1004 that include the aggregated edge resources.

In step 1106, information characterizing at least the metered utilization of the aggregated edge resources is committed to a distributed ledger. In some embodiments, the information committed to the distributed ledger further comprises information characterizing at least one instance of a matching by the edge utility system of one or more edge resources requested by a first user with one or more edge resources available from a second user, the aggregated edge resources comprising the one or more edge resources available from the second user that match the one or more edge resources requested by the first user. Terms such as "information committed to a distributed ledger" as used herein are intended to be broadly construed. In some embodiments, the distributed ledger comprises one or more blockchains (e.g., a public blockchain and/or a private blockchain) and committing information characterizing at least the metered utilization of the aggregated edge resources to the distributed ledger comprises providing one or more blocks containing the information for storage in the one or more blockchains. For example, such blocks may be generated by the edge nodes 1004 to include metadata or other information emitted or otherwise generated by the metering logic 1005, and transmitted by the edge nodes 1004 over a network to the distributed ledger 1010. At least portions of the distributed ledger are accessible to the users of the edge utility system via at least one GUI of the edge utility system, such as the GUI 1012 of edge utility system 1000.

The committing of metering information and other related information to the distributed ledger allows users of the edge utility system to verify various aspects of their transactions within the edge utility system, such as the provision and utilization of particular types and amounts of edge resources at particular times, and appropriate pricing and payment settlement associated with the utilization of those edge resources. Additional or alternative information can be committed to the distributed ledger in these and other embodiments, such as, for example, capacity reservations in the case of credits for future purchase.

In some embodiments, utilization of the distributed ledger is provided as a user-configurable option for each of one or more of the users of the edge utility system, and responsive to selection of that option by a given user, the committing of information relating to edge utility system transactions involving the given user is activated.

The particular processing operations and other system functionality described in conjunction with the flow diagram of FIG. 11 are presented by way of illustrative example only, and should not be construed as limiting the scope of the disclosure in any way. Alternative embodiments can use other types of processing operations involving core computing sites, edge computing sites and functionality for distributed ledger verification for dynamic aggregation of edge resources. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different distributed ledger verification arrangements within a given information processing system.

Functionality such as that described in conjunction with the flow diagram of FIG. 11 can be implemented at least in part in the form of one or more software programs stored in memory and executed by a processor of a processing device such as a computer or server.

The edge utility systems in the illustrative embodiments of FIGS. 10 and 11 implement a distributed ledger as an immutable audit mechanism for metering, purchasing, or selling edge capacity or credits. Such auditing is an example of what is more generally referred to as "verification" utilizing a distributed ledger.

For example, in an edge utility system of the type disclosed herein, the individuals or organizations behind buying and selling of edge resources may not be easy to identify or otherwise apparent to one another. At the same time, it is hard to verify that transactions are occurring as expected. As a result, it can be hard to determine a baseline level of trust, which could reduce the likelihood that users will participate in the edge utility market.

Distributed ledger embodiments disclosed herein address these and other issues associated with a potentially unclear level of trustworthiness among participants.

For example, such embodiments provide verified metering of edge resources. With so many potential buyers and sellers of edge capacity, users need a way to verify that the capacity they bought is made available to them at the correct time and in the correct amounts, and with other specified characteristics.

Accordingly, the distributed ledger functionality disclosed herein provides a mechanism through which the parties can configure their setups to verify their transactions. For example, in some embodiments, a backup and verification process is implemented, by configuring an edge utility system with distributed ledger functionality to provide a backup and/or documentation option for verifying metering, purchasing, or selling edge capacity resources or associated credits (which can, in some embodiments, be resold or otherwise transferred).

Examples of variables and other information that can be stored in one or more blocks of a distributed ledger as disclosed herein illustratively include purchase price, purchase date and time, purchase confirmation, when the purchased resources need to be available (e.g., right away or at a specific time in the future; this may be particularly important in the case of credits that may be resold or otherwise transferred), unique IDs for the buyer, seller, and marketplace, snapshots of the relevant resources available from the seller (or reserved by the seller) at the time of sale, any restrictions on resales, the latest update date, along with the latest updates on resource availability, and other similar characteristics, or various combinations of these and other characteristics. The particular variables and other information stored in a given embodiment will vary depending upon its particular implementation.

Illustrative embodiments herein also provide the ability to automatically refresh the stored values, sending them to the distributed ledger along with a version history and/or other information if desired.

An example algorithm for implementing an edge utility system such as system 1000 with a distributed ledger such as distributed ledger 1010 illustratively includes the following steps, although additional or alternative steps can be used in other embodiments:

1. A distributed ledger is associated with an edge utility marketplace of the type previously described.
2. The user selects distributed ledger verification, and associates the account with a distributed ledger. In some cases, the user may be an administrator. It is assumed in this embodiment that the edge utility system is configured to include distributed ledger verification and other security options, such as attestation, as a selectable user configuration preference. Some embodiments may require distributed ledger verification, in which case it would not be part of the configuration process. In some embodiments, the specific variables to include in the distributed ledger backup may be configurable
3. Metering begins. As the metering content is emitted to the marketplace, it can be backed up (e.g., immediately, at regular intervals, or at pre-determined times) to the distributed ledger. Depending on the embodiment, the marketplace, the resource owner, or a neutral third party can be the owner of the distributed ledger backup. The distributed ledger backup owner can use a GUI, and in some cases other methods such as attestation, to show others a verified version of the backup. Depending on the embodiment, aggregate prices (anonymized) can be shown to the general public/other users so they can see how the prices they receive compare to other prices for similar requirements. Other variables and/or metrics can be compared to averages or other composite information in a similar manner.
4. The matching process occurs, as previously described herein. If the sale pertains to credits that can be used in the future, prior to completion of the sale, a search algorithm can be run among the other sales that the seller has made, and the results can be compared against the seller's total capacity, in order to ensure that the same resources will not been sold more than once. In some embodiments this may result in an inability to complete the sale, for example, or in the seller or marketplace issuing refunds. Such an arrangement may be configured such that the meter is capable of detecting if the seller is also selling to other consumers outside of the particular marketplace, for example by detecting usage patterns on the edge device. To increase trust levels, users also have the option to provide ratings for their experience, which will be visible to other users.
5. Once a match is made, the buyer can also receive access to view the verified metering statistics, for example through a marketplace GUI.
6. The buyer decides to accept the purchase or not (which can be done automatically) if the specified criteria are met.
7. When a purchase is made, the sale details are recorded to the distributed ledger, which is also visible through the marketplace to the buyer and the seller (the specific visible information may vary).
8. The buyer can resell their purchase credits, for example, using a cryptocurrency wallet connected to a marketplace.
9. As changes are made to the meters and purchases, the distributed ledger and associated views are updated.

In some embodiments, proof of work is provided by the edge nodes or other edge infrastructure providers and buyers should be able to verify that the workloads have been executed at the appropriate time(s) and using the appropriate hardware and/or software environment. The actual block structure utilized for committing information to the distributed ledger is implementation dependent.

As one example, an edge utility system can implement a private distributed ledger, configured such that buyers of edge resources can purchase and exchange credit on the private distributed ledger. Once workloads are executed, the credit would then be transferred to an edge infrastructure provider in response to receipt of corresponding proof of work.

Numerous alternative arrangements of public and/or private blockchains or other types of distributed ledgers can be used in other embodiments.

For example, in some embodiments, a distributed ledger based on a public blockchain may be configured to include some more complex factors, such as handling cryptocurrency inflation/deflation, or other factors relating to resource pricing.

In some embodiments, the distributed ledger is used to backup information characterizing edge resource purchases and sales within the edge utility system, and additionally or alternatively related information such as metadata or other information from edge utility meters, enabling a high level of trust among users, while also creating a foundation for reselling unused credits. For example, some embodiments utilize the distributed ledger to create and track resellable edge utility resource credits. Such arrangements illustratively make it possible to check if capacity has already been sold.

Additionally or alternatively, the distributed ledger in illustrative embodiments is utilized to provide an ability to lock in pricing. For example, the combination of immutable metering information with visibility into the agreed-upon pricing at the time of the transaction enables the user to verify that the pricing didn't change after the agreement was made.

Moreover, the distributed ledger in some embodiments provides an ability to verify fairness in pricing. For example, comparisons to sales prices that other users with similar requirements have received will enable the buyer to determine if they are receiving a fair price. A GUI that enables users to search, sort, and visualize the prices that others are receiving, compared to the price they are considering, can help the user to find fair pricing.

Some embodiments are configured to utilize the distributed ledger to predict whether an edge device is selling to users outside of the marketplace. For example, these and other embodiments can use historical data and usage patterns to determine whether a seller is likely to be selling to users outside of the marketplace, and to take action (such as stopping sales, issuing warnings, etc.) to that user. In an arrangement of this type, for example, verified historical data and/or usage patterns stored in the distributed ledger could be used as inputs into an ML algorithm that is configured to make the prediction.

Further illustrative embodiments of edge utility systems will now be described with reference to FIGS. 12 through 14. These embodiments provide examples of edge utility systems with user-configurable trust settings for dynamic aggregation of edge resources.

FIG. 12 shows examples of trust factors 1200 that can be utilized in user-configured trust settings for dynamic aggregation of edge resources in an illustrative embodiment. The trust factors 1200, also referred to as sample trust factors in the figure, include a first set of trust factors 1202 relating to current status and a second set of trust factors 1204 relating to the historical data. These trust factors, or subsets thereof, are illustratively utilized by an edge utility system to support functionality for user-configurable trust settings. For example, a given user of the edge utility system illustratively provides information to the edge utility system that specifies various trust characteristics, individually or collectively referred to herein as a "trust level," that the given user requires of one or more providers of edge resources that are used to execute one or more workloads of the given user in the edge utility system. The particular trust level corresponding to the information provided by the given user is also referred to herein as a "trust setting" configured at least in part by the given user.

In some embodiments, trust functionality is provided that enables users to define and configure trust settings for edge utility transactions in an edge utility market, and in other contexts. It also enables automatically generating trust scores, as will be described in more detail below.

As indicated previously, in an edge utility system of the type disclosed herein, it may not always be clear who the people or organizations behind buying and selling are. As a result, it can be hard to determine a baseline level of trust, which could reduce the likelihood of participating in the edge utility market. Also, trust means different things to different people, and it is therefore hard to define and implement a one size fits all approach to helping users trust one another.

Edge utility systems in some embodiments disclosed herein provide an edge utility marketplace where edge resources can be bought and sold. Such systems illustratively allow users to join the network and configure metering and matching preferences. The distributed ledger functionality described above provides an additional mechanism through which the parties can configure their setups to verify their transactions. For example, as part of a backup and verification process, the distributed ledger functionality provides a backup and/or documentation option for verifying metering, purchasing, or selling edge capacity resources or associated credits (which can, in some embodiments, be resold or otherwise transferred).

Additional trust functionality to be described below makes it possible for users to define and configure their own trust settings at the edge in an edge utility market, and in other contexts relating to dynamic aggregation of edge resources.

For example, as generally shown in the sample trust factors 1200 of FIG. 12, in deciding who to purchase edge resources from, buyers can select from current and historical options such as specifying use of devices in a trusted network, sellers who have been verified through attestation or another similar mechanism, sellers who have a history of delivering what was promised, sellers that the buyer has previously purchased from, and who met the agreed upon criteria in the past and do not currently have compromised security, sellers with historically high levels of performance (e.g., uptime, latency, delivery of promised availability, etc.) relative to the mean or another similar metric, sellers whose pricing is at, near, or below the mean or another similar metric, whether the seller has verified their edge security settings, the latest update date, along with the latest updates on resource availability, seller policies and/or SLAs, seller performance in the face of downtime or other similar issues (e.g., alerting buyers to issues, resolving issues quickly, etc.), trust ratings or other types of trust scores (including manual and auto-generated trust ratings or other trust scores) based on variables such as those listed above, and/or other similar characteristics (e.g., relating to infrastructure and environment provided by seller that would affect buyers' decision), or various combinations of these and other characteristics.

Figure 13:
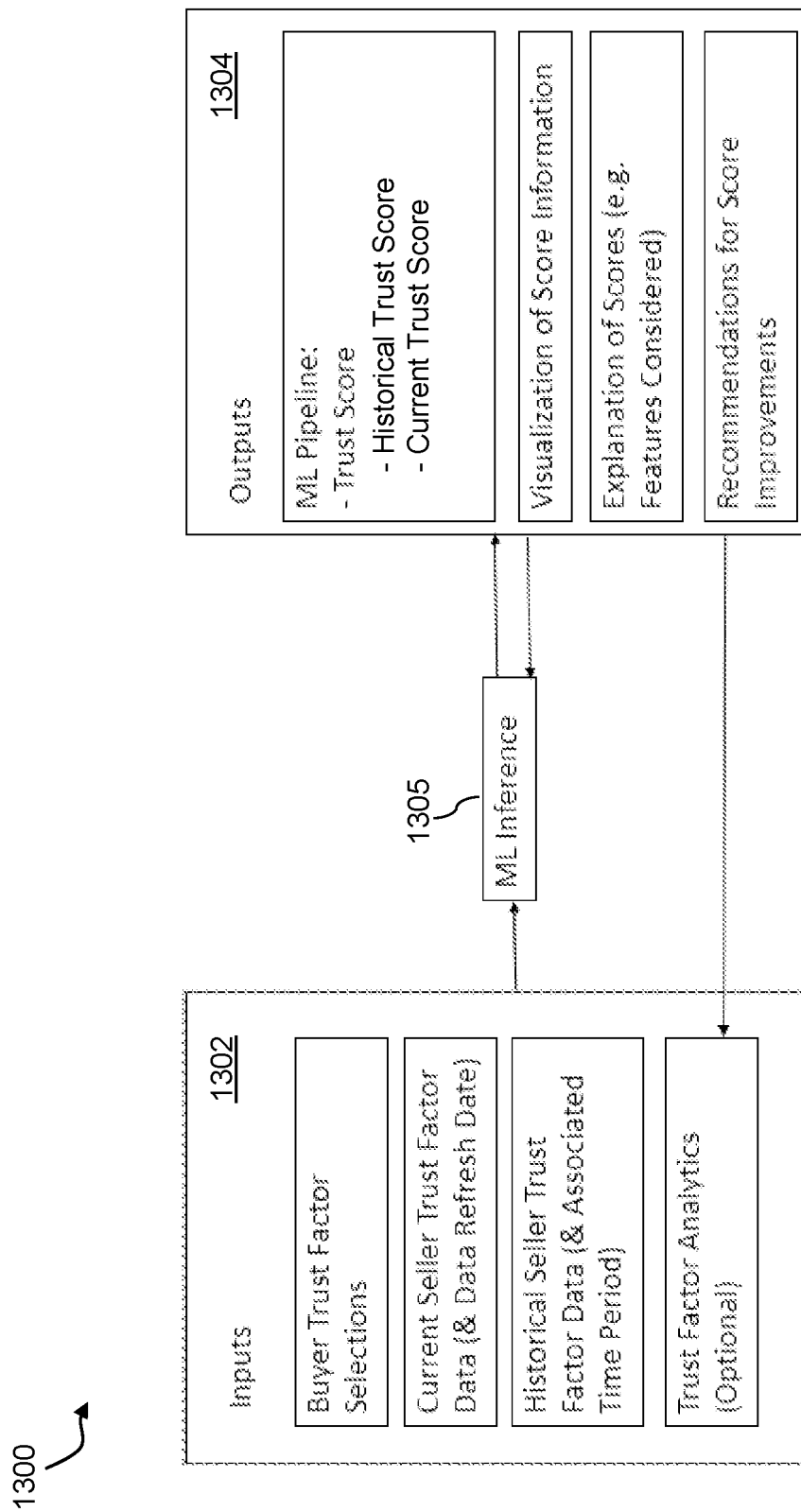
FIG. 13 illustrates the operation of an edge utility system with user-configurable trust settings for dynamic aggregation of edge resources in an illustrative embodiment.

FIG. 13 shows an edge utility system 1300 with user-configurable trust settings for dynamic aggregation of edge resources in an illustrative embodiment. The portion of the system 1300 illustrated in the figure includes a first set of data structures 1302 storing information relating to inputs, a second set of data structures 1304 storing information relating to outputs, and a machine learning (ML) inference engine 1305 that operates on and updates at least portions of the information stored in one or more of the data structures 1302 and 1304. It is assumed that the system 1300 further comprises a plurality of edge nodes or other edge computing sites, a centralized scheduler, possibly implemented at least in part using one or more core computing sites, and a plurality of end-user devices, although such components are not explicitly shown in this particular figure.

The ML inference engine 1305 illustratively executes one or more ML algorithms in accordance with one or more corresponding ML models in order to implement an ML pipeline. The ML models illustratively comprise one or more neural networks, although other types of ML models can be used. The ML inference engine 1305 is an example of what is more generally referred to herein as an "ML system."

As indicated in the figure, the input-related information stored in data structures 1302 illustratively comprises buyer trust factor selections, current seller trust factor data and data refresh date, historical seller trust factor data and associated time period, and optional trust factor analytics, although the indication that the latter information is optional in the present embodiment does not mean that it or other types of information is required in this or other embodiments. The output-related information includes information associated with the ML pipeline implemented by the ML inference engine 1305 (e.g., trust score, including historical trust score and current trust score), visualization of score information, explanation of scores (e.g., features considered), and recommendations for score improvements.

It is to be appreciated that the particular arrangements of data structures 1302 and 1304 and the input-related and output-related information stored therein is presented by way of illustrative example only, and can be varied in other embodiments. Additional or alternative data structures and/or information can be used.

An exemplary process implementing user-configurable trust settings for dynamic aggregation of edge resources will now be described in more detail with reference to the flow diagram of FIG. 14. It is to be understood that this particular process is only an example, and that additional or alternative processes implementing user-configurable trust settings in conjunction with dynamic aggregation of edge resources across multiple edge computing sites may be used in other embodiments.

In this embodiment, the process includes steps 1400 through 1406. These steps are assumed to be performed by the edge utility system 1300 comprising ML inference engine 1305, although it is to be appreciated that other arrangements of edge utility system components can implement this or other similar processes in other embodiments. For example, some embodiments can combine user-configured trust settings with a distributed ledger of the type previously described. The FIG. 14 process may be viewed as representing an example algorithm performed at least in part by one or more instances of edge resource aggregation logic 110 in system 100 of FIG. 1.

In step 1400, information specifying a trust level for one or more providers of edge resources is received from a first user in an edge utility system, which may be, for example, system 100 of FIG. 1, system 900 of FIG. 9, system 1000 of FIG. 10 or system 1300 of FIG. 13, or another edge utility system having at least portions of the features and functionality of one or more of these example systems. Such information is illustratively provided via one or more user-configurable trust settings entered, selected or otherwise activated by the user via a GUI of the edge utility system, such as GUI 1012 in system 1000.

For example, in some embodiments, the information received from the first user and specifying a trust level for one or more providers of edge resources comprises a selection of at least one trust factor from a plurality of available trust factors, such as those illustrated in FIG. 12, with the plurality of available trust factors including one or more trust factors relating to a current status of at least a given one of the providers and one or more trust factors relating to historical data of at least the given provider.

The one or more trust factors relating to a current status of at least the given provider illustratively comprise at least one of association of edge devices of the given provider with a trusted network, implementation of a particular type of verification of the given provider in the edge utility system, an absence of any security compromise of the given provider, provision of active security monitoring for the given provider, one or more current trust ratings of the given provider, and one or more current performance measures of the given provider, although additional or alternative trust factors relating to current status may be used, as illustrated in the first set of trust factors 1202 of FIG. 12.

The one or more trust factors relating to historical data of at least the given provider illustratively comprise at least one of historical security compliance of the given provider, one or more prior transaction relationships of the given provider, one or more historical trust ratings of the given provider, and one or more historical performance measures of the given provider, although additional or alternative trust factors relating to historical data may be used, as illustrated in the second set of trust factors 1204 of FIG. 12.

It should be noted that the term "trust level" as used herein is intended to be broadly construed, and can comprise, for example, particular values, ranges or other indicators of trustworthiness of a given provider of edge resources, possibly based at least in part on one or more of the above-noted trust factors or additional or alternative trust factors described elsewhere herein.

In step 1402, edge resources of a plurality of edge computing sites of the edge utility system are aggregated in the manner previously described, with the aggregated edge resources including at least edge resources of the one or more providers. For example, the aggregated edge resources illustratively include edge resources provided by at least one user of the edge utility system for utilization by one or more other users of the edge utility system, as previously described in conjunction with other embodiments.

In step 1404, particular ones of the aggregated edge resources are selected based at least in part on the specified trust level.

In some embodiments, the edge utility system is configured to track one or more trust factors for each of the one or more providers over time, and the selection of particular ones of the aggregated edge resources is based at least in part on the one or more tracked trust factors and the specified trust level.

This illustratively involves generating a trust score for each of the one or more providers based at least in part on the tracking of the one or more trust factors over time, with the selection of particular ones of the aggregated edge resources being based at least in part on a comparison of the trust scores to the specified trust level, although additional or alternative selection techniques can be used. For example, other types of comparisons can be used, possibly involving comparison of one or more aspects of a trust score for a given provider of edge resources to trust scores of one or more other providers.

In some embodiments, the trust scores are generated utilizing a machine learning system, also referred to herein as an ML system. For example, the ML system may be configured to implement a neural network model that is initially trained on historical data and subsequently retrained in an unsupervised manner. It is to be appreciated that other types of ML systems using other types of models can be used. For example, alternative learning arrangements, including federated learning, can be used.

In other embodiments, the trust scores are generated as a weighted combination of at least a subset of the tracked trust factors.

In step 1406, the selected particular ones of the aggregated edge resources are utilized to execute at least a portion of a workload of the first user. As indicated previously, such a workload of the first user can comprise, for example, one or more applications, portions of one or more applications, or other types and arrangements of executable program code, including microservices and other types of services.

Figure 14:
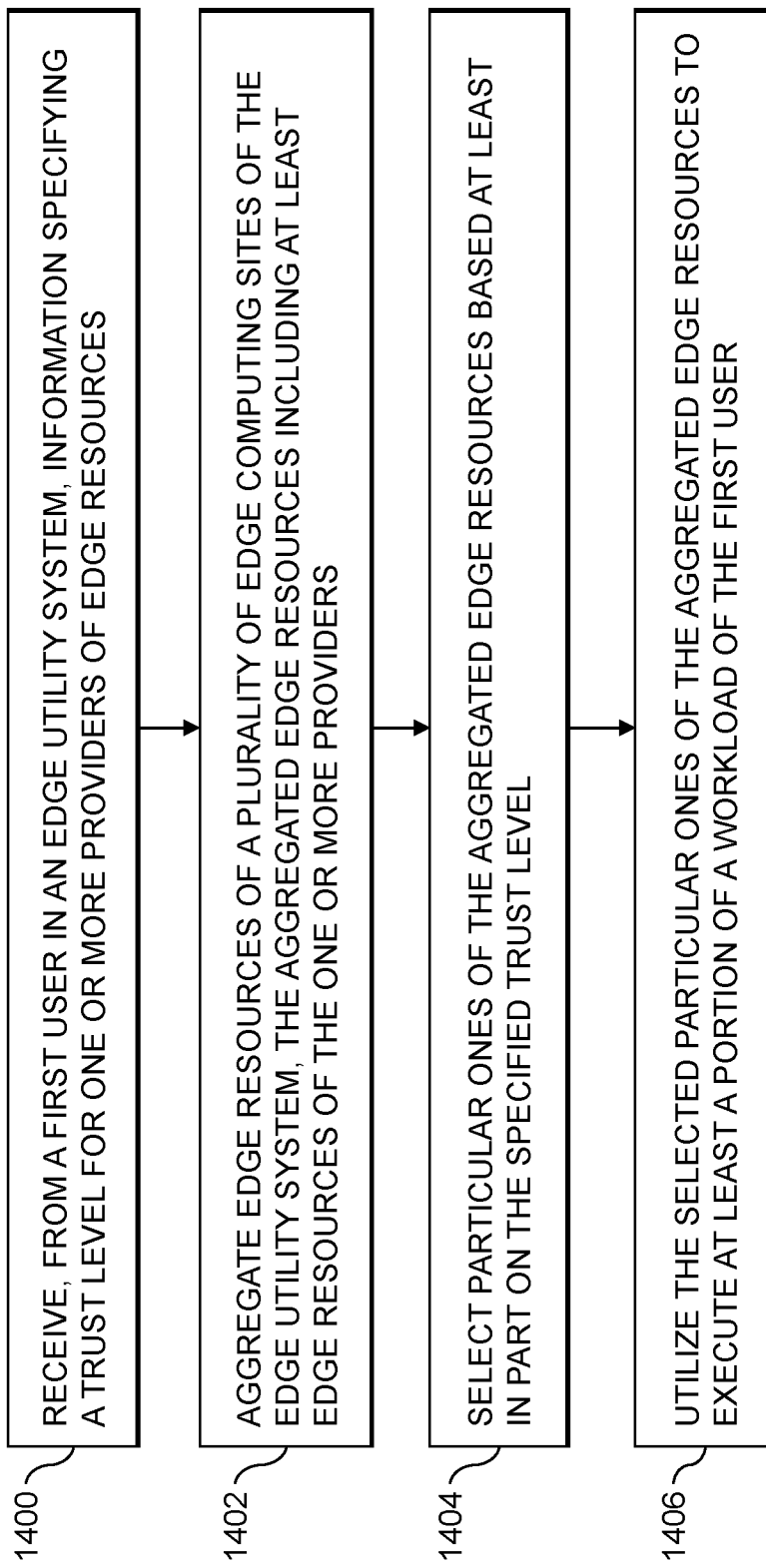
FIG. 14 is a flow diagram of an exemplary process implementing user-configurable trust settings for dynamic aggregation of edge resources in an illustrative embodiment.

The particular processing operations and other system functionality described in conjunction with the flow diagram of FIG. 14 are presented by way of illustrative example only, and should not be construed as limiting the scope of the disclosure in any way. Alternative embodiments can use other types of processing operations involving core computing sites, edge computing sites and functionality for user-configurable trust settings for dynamic aggregation of edge resources. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different user-configurable trust setting arrangements within a given information processing system.

Functionality such as that described in conjunction with the flow diagram of FIG. 14 can be implemented at least in part in the form of one or more software programs stored in memory and executed by a processor of a processing device such as a computer or server.

The edge utility systems in the illustrative embodiments of FIGS. 12 through 14 advantageously implement user-configurable trust settings for purchasing or otherwise acquiring, and selling or otherwise providing, edge capacity or associated credits involving edge resources of edge nodes or other edge computing sites.

An example algorithm for implementing an edge utility system such as system 1300 with user-configurable trust settings illustratively includes the following steps, although additional or alternative steps can be used in other embodiments:

1. Seller data pertaining to the trust factors outlined above are logged and stored. Current factors depend on the seller's current status/compliance with trust requirements, updated (and potentially marked as updated) within a specified amount of time. The edge utility market or its designee can capture and store data about the seller's current status pertaining to each trust variable. Historical factors depend on the edge utility market, or its designee, logging and storing data and in some cases performing analytics on that data. Data may be stored using a distributed ledger as described previously, or within the edge utility system or another secure location that the edge utility system designates.

An example of historical data that requires analytics is how the seller's historical pricing has compared to the mean price over time. In this case, for any given transaction that the seller has been a party to, the difference between the seller's price and the mean price at a particular point in time can be calculated. The differences over time could be calculated and displayed via a GUI, for example, by showing the percentage difference between the two with optional visualizations (e.g., colored text, graphs, etc.) In some cases a score that compares a seller's historical pricing to the mean could be added, for example, by calculating in which percentile over or under the mean the seller has traditionally been as compared to other users. In other cases this data may simply be used as an input into the ML inference model that determines auto-calculations of trust. Similar calculations and processes can be used to evaluate the seller based on other variables mentioned above.

If the volume of data becomes too large, then portions of the data can be incorporated into the model as additional learning such that some of the actual historical data may not need to be stored.

2. This historical data can be used as an input to the auto-calculated trust score. In some cases, the historical data will be fed to an ML model (e.g. a neural network) directly. In some cases, the historical data will be processed and analytics will be performed on it before it is used to calculate an automated trust score. In some cases, an ML model is not utilized, and instead the trust score is directly calculated, for example, using a weight-based approach.

3. The trust score for each seller is calculated based on results from the ML inference or direct calculation. If ML inferencing has been used, then a feedback loop can be established, for example, by allowing users to input satisfaction ratings, or by evaluating whether the seller has continued to uphold its current standards (within a certain threshold) after the transaction. The input to the ML model can be based on various settings of the environment, while the labels can be scores based on user rating and/or continuous evaluation to uphold standards. Historical data can be used to train a pre-defined model and the model can be re-trained continuously in an unsupervised manner.

4. A trust ranking of the sellers is determined based on trust scores. This will feed into the edge utility matching algorithm described elsewhere herein.

5. A distributed ledger may be updated with the results of any or all of the above steps, and a timestamp for those results, as described previously. One or more additional or alternative storage locations could also be updated.

6. A buyer selects trust as a matching preference. Within the trust category, buyers or an administrator can select current and/or historical trust factors, such as those outlined above.

7. Trust is factored into the edge utility matching results.

8. In some embodiments, the buyer may be able to see a GUI that explains the trust scores. For example, they may see the inputs that went into the score, or some of the analytics that were calculated during the process. Graphical visualizations (e.g., ratings for each factor, or graphs showing comparisons over time) may also be used.

9. In some embodiments, the seller may be notified of their trust score and provided with recommendations on how to improve it.

The ML algorithm in some embodiments comprises a regression algorithm, which can be implemented utilizing a time-series neural network, such as convolutional neural network (CNN) or a long short-term memory (LSTM) neural network. The input of the ML algorithm illustratively comprises at least a subset of the above-described trust-related criteria, presented in a time-series manner, and the output of the ML algorithm illustratively comprises a trust score.

In other embodiments, a weight-based approach can be utilized as an alternative to the above-described ML algorithm in computing trust scores.

For example, a trust score is illustratively calculated without using ML by taking the various sample trust factors (e.g., at least a subset of the factors shown in FIG. 10) and then applying a specified weighting to each. For example, such a trust score for an embodiment utilizing n trust variables would be of the form:

([Variable 1]*[Weighting of Variable 1]+ . . . +[Variable $n$]*[Weighting of Variable $n$])/$n$.

Depending on the implementation, many different calculations could be used. For example, the division by n could be eliminated in the above calculation, and/or different functions of the n trust variables may be used. In some cases, the user could also see/configure a personalized/custom score (e.g., a binary indicator of whether or not their standards are met).

Some embodiments are configured to provide user-configured trust scores for edge utility transactions.

For example, users can define and configure trust settings for edge utility transactions in an edge utility market and in other contexts relating to dynamic aggregation of edge resources.

Such trust scores are automatically generated in some embodiments.

Illustrative embodiments provide the ability to configure and automatically generate trust ratings or other types of trust scores.

Additionally or alternatively, some embodiments provide a feedback mechanism to help users improve their trustworthiness in an edge utility market and in other system contexts.

As indicated previously, the illustrative embodiments disclosed herein can provide a number of significant advantages relative to conventional arrangements.

For example, some embodiments are advantageously configured to provide an edge utility system that dynamically aggregates edge resources across multiple edge computing sites in accordance with user-configured preferences and priorities. Such an arrangement facilitates the buying and selling of edge capacity using a wide variety of factors, including energy efficiency of the edge resources and/or trust of the edge resource provider.

Some embodiments provide an edge utility matching process which accounts for factors other than price/cost, illustratively using heuristic search and scoring functions. Such a process can be based at least in part on, for example, a descriptor of edge services available from a producer, and a descriptor of edge services required by a consumer, or other arrangements of user inputs populated into one or more data structures.

One or more illustrative embodiments are advantageously configured to dynamically assemble an edge network in which users such as buyers and sellers of edge resources can easily join and leave.

Some embodiments provide an ability to automatically adjust prices within specified limits when particular edge resources are in high or low demand.

Additionally or alternatively, illustrative embodiments make it possible to consider several different types of events, such as I/O events, scheduled events, completed events, and reserved events (which would take place in the future). The total cost can be a combination of the amount reserved and the amount actually consumed, which may be less than if both were calculated separately.

Some embodiments implement random prioritization to ensure fairness. For example, an edge utility system can be configured to randomly assign sellers to buyers, as long as the sellers meet buyer needs, in order to ensure fairness.

In one or more embodiments, an ability to flag high-priority workloads is provided. Such an arrangement makes it possible to flag workloads of particular importance, such as those associated with providing assistance in a natural disaster. This is especially useful when the edge network is not capable of handling all buyer requirements, and lower-priority workloads need to be temporarily stopped or delayed.

Additionally or alternatively, illustrative embodiments can implement data preservation functionality to ensure that data stored at edge devices is preserved even during upgrades and deployments.

Other advantages include those described previously as being more particularly associated with distributed ledger verification and/or user-configured trust settings in illustrative embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for dynamic aggregation of edge resources across multiple edge computing sites will now be described in greater detail with reference to FIGS. 15 and 16. Although described in the context of system 100, these platforms may also be used to implement at least portions of other information processing systems in other embodiments.

Figure 15:
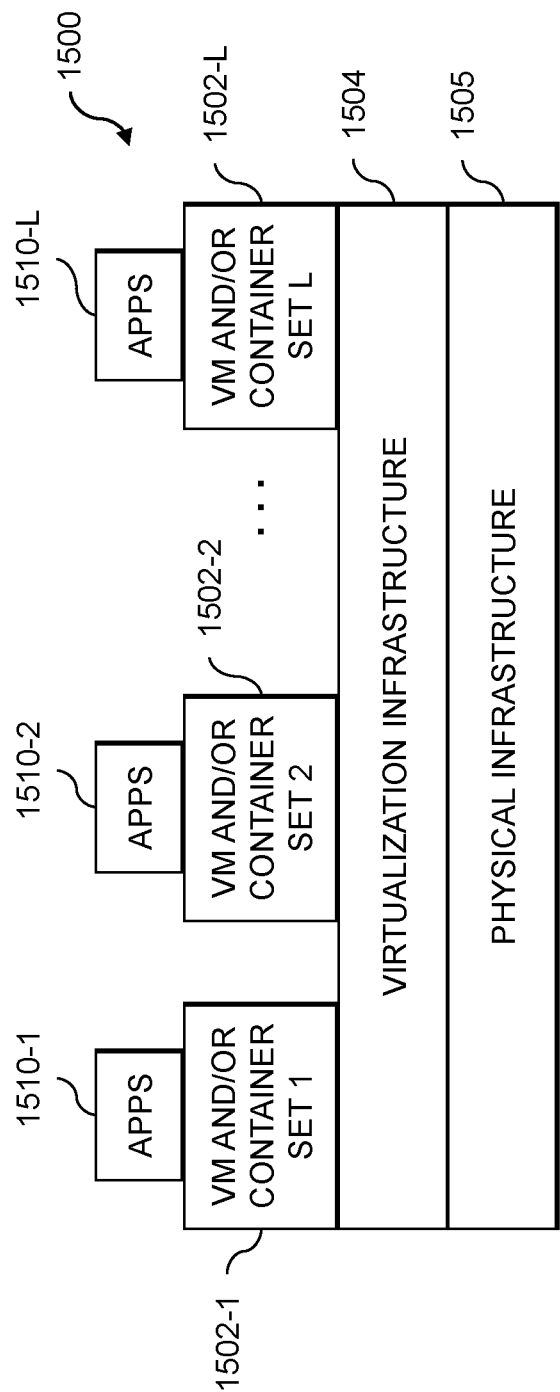
FIGS. 15 and 16 show examples of processing platforms that may be utilized to implement at least a portion of an information processing system in illustrative embodiments.
Figure 16:
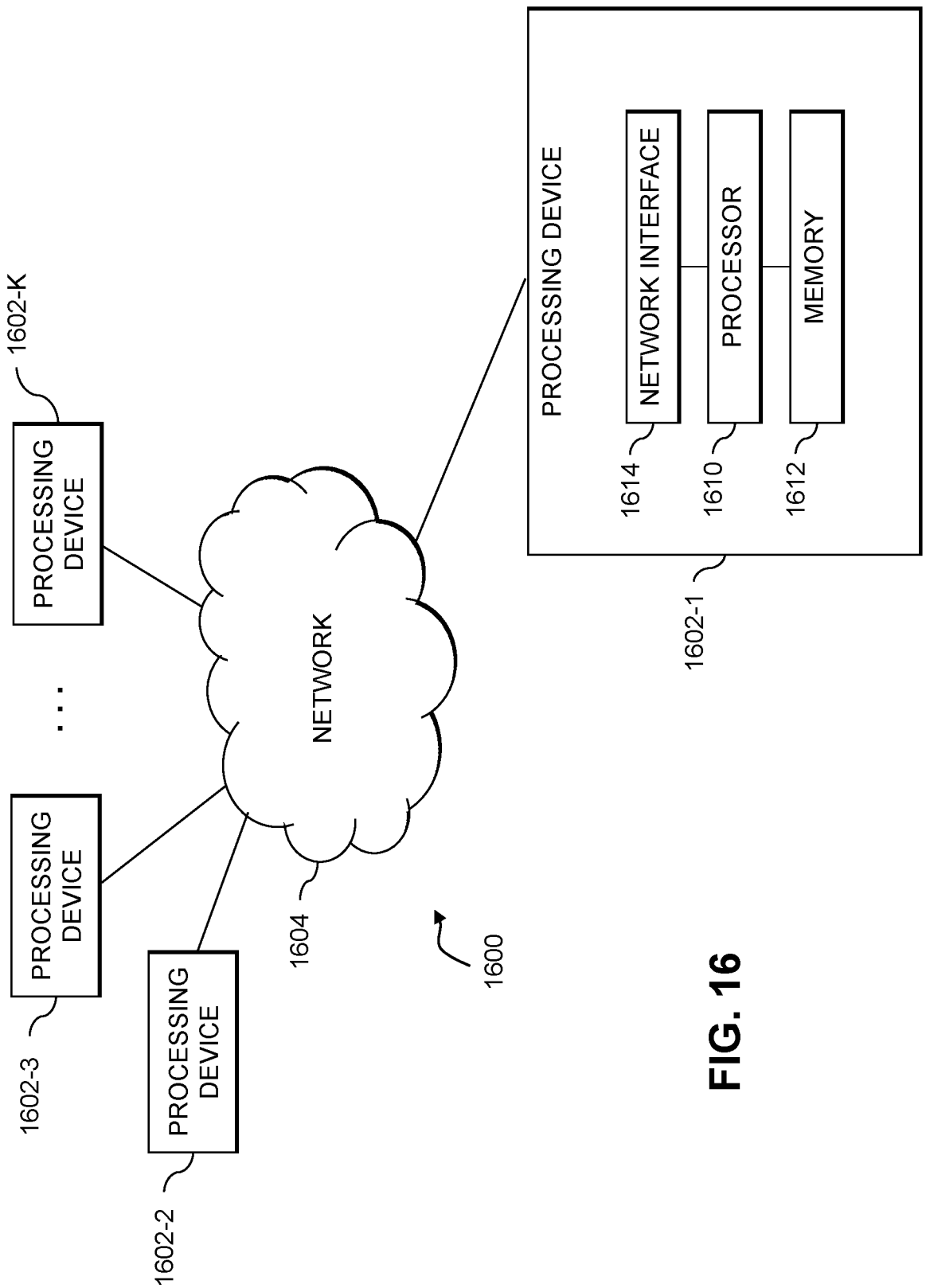

FIG. 15 shows an example processing platform comprising cloud infrastructure 1500. The cloud infrastructure 1500 comprises a combination of physical and virtual processing resources that may be utilized to implement at least a portion of the information processing system 100 in FIG. 1. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 may comprise respective VMs, respective sets of one or more containers, or respective sets of one or more containers running in VMs.

In some implementations of the FIG. 15 embodiment, the VMs/container sets 1502 comprise respective VMs implemented using virtualization infrastructure 1504 that comprises at least one hypervisor. A hypervisor platform may be used to implement a hypervisor within the virtualization infrastructure 1504, where the hypervisor platform has an associated virtual infrastructure management system. The underlying physical machines may comprise one or more distributed processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for dynamic aggregation of edge resources across multiple edge computing sites as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, core computing sites, edge computing sites, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to receive from a first user in an edge utility system information specifying a trust level for one or more providers of edge resources;
   to aggregate edge resources of a plurality of edge computing sites of the edge utility system, the aggregated edge resources including at least edge resources of the one or more providers;
   to select particular ones of the aggregated edge resources based at least in part on the specified trust level; and
   to utilize the selected particular ones of the aggregated edge resources to execute at least a portion of a workload of the first user;
   wherein the at least one processing device is further configured:
   to track one or more trust factors for each of the one or more providers over time and wherein the selection of particular ones of the aggregated edge resources is based at least in part on the one or more tracked trust factors and the specified trust level; and
   to generate a trust score for each of the one or more providers based at least in part on the tracking of the one or more trust factors over time and wherein the selection of particular ones of the aggregated edge resources is based at least in part on a comparison of the trust scores to the specified trust level;
   wherein the trust scores are generated for the one or more providers at least in part as a weighted combination of at least a subset of the one or more tracked trust factors for each of the one or more providers.

2. The apparatus of claim 1 wherein each of at least a subset of the edge computing sites of the edge utility system comprises a plurality of edge devices and at least one edge utility meter configured to measure the utilization of edge resources of the edge devices of that edge computing site by one or more of a plurality of users in the edge utility system.

3. The apparatus of claim 1 wherein the edge resources of each of at least a subset of the edge computing sites of the edge utility system comprise at least one of compute, storage and network resources of a plurality of edge devices of that edge computing site.

4. The apparatus of claim 1 wherein aggregating edge resources of the edge computing sites of the edge utility system comprises aggregating the edge resources utilizing a centralized scheduler configured to access the edge computing sites via at least one network.

5. The apparatus of claim 1 wherein the edge utility system further comprises one or more core computing sites that include at least one data center implemented at least in part utilizing cloud infrastructure.

6. The apparatus of claim 5 wherein at least one of the one or more core computing sites implements at least a portion of a centralized scheduler configured to perform the aggregating of the edge resources.

7. The apparatus of claim 1 wherein the information received from the first user and specifying a trust level for one or more providers of edge resources comprises a selection of at least one trust factor from a plurality of available trust factors, the plurality of available trust factors including one or more trust factors relating to a current status of at least a given one of the providers and one or more trust factors relating to historical data of at least the given provider.

8. The apparatus of claim 7 wherein the one or more trust factors relating to a current status of at least the given provider comprise at least one of:
  association of edge devices of the given provider with a trusted network;
  implementation of a particular type of verification of the given provider in the edge utility system;
  an absence of any security compromise of the given provider;
  provision of active security monitoring for the given provider;
  one or more current trust ratings of the given provider; and
  one or more current performance measures of the given provider.

9. The apparatus of claim 7 wherein the one or more trust factors relating to historical data of at least the given provider comprise at least one of:
  historical security compliance of the given provider;
  one or more prior transaction relationships of the given provider;
  one or more historical trust ratings of the given provider; and
  one or more historical performance measures of the given provider.

10. The apparatus of claim 1 wherein the at least one processing device is further configured to generate the trust scores at least in part utilizing a machine learning system.

11. The apparatus of claim 10 wherein the machine learning system implements a neural network model that is initially trained on historical data and subsequently retrained in an unsupervised manner.

12. A computer program product comprising a non-transitory processor-readable storage medium having stored therein program code of one or more software programs, wherein the program code when executed by at least one processing device causes the at least one processing device:
  to receive from a first user in an edge utility system information specifying a trust level for one or more providers of edge resources;
  to aggregate edge resources of a plurality of edge computing sites of the edge utility system, the aggregated edge resources including at least edge resources of the one or more providers;
  to select particular ones of the aggregated edge resources based at least in part on the specified trust level; and
  to utilize the selected particular ones of the aggregated edge resources to execute at least a portion of a workload of the first user;
  wherein the program code when executed by the at least one processing device further causes the at least one processing device:
  to track one or more trust factors for each of the one or more providers over time and wherein the selection of particular ones of the aggregated edge resources is based at least in part on the one or more tracked trust factors and the specified trust level; and
  to generate a trust score for each of the one or more providers based at least in part on the tracking of the one or more trust factors over time and wherein the selection of particular ones of the aggregated edge resources is based at least in part on a comparison of the trust scores to the specified trust level;
  wherein the trust scores are generated for the one or more providers at least in part as a weighted combination of at least a subset of the one or more tracked trust factors for each of the one or more providers.

13. The computer program product of claim 12 wherein the information received from the first user and specifying a trust level for one or more providers of edge resources comprises a selection of at least one trust factor from a plurality of available trust factors, the plurality of available trust factors including one or more trust factors relating to a current status of at least a given one of the providers and one or more trust factors relating to historical data of at least the given provider.

14. The computer program product of claim 12 wherein the trust scores are generated at least in part utilizing a machine learning system.

15. A method comprising:
  receiving from a first user in an edge utility system information specifying a trust level for one or more providers of edge resources;
  aggregating edge resources of a plurality of edge computing sites of the edge utility system, the aggregated edge resources including at least edge resources of the one or more providers;
  selecting particular ones of the aggregated edge resources based at least in part on the specified trust level; and
  utilizing the selected particular ones of the aggregated edge resources to execute at least a portion of a workload of the first user;
  wherein the method further comprises:
  tracking one or more trust factors for each of the one or more providers over time and wherein the selection of particular ones of the aggregated edge resources is based at least in part on the one or more tracked trust factors and the specified trust level; and
  generating a trust score for each of the one or more providers based at least in part on the tracking of the one or more trust factors over time and wherein the selection of particular ones of the aggregated edge resources is based at least in part on a comparison of the trust scores to the specified trust level;
  wherein the trust scores are generated for the one or more providers at least in part as a weighted combination of at least a subset of the one or more tracked trust factors for each of the one or more providers; and
  wherein the method is performed by at least one processing device comprising a processor coupled to a memory.

16. The method of claim 15 wherein the information received from the first user and specifying a trust level for one or more providers of edge resources comprises a selection of at least one trust factor from a plurality of available trust factors, the plurality of available trust factors including one or more trust factors relating to a current status of at least a given one of the providers and one or more trust factors relating to historical data of at least the given provider.

17. The method of claim 16 wherein the one or more trust factors relating to a current status of at least the given provider comprise at least one of:
- association of edge devices of the given provider with a trusted network;
- implementation of a particular type of verification of the given provider in the edge utility system;
- an absence of any security compromise of the given provider;
- provision of active security monitoring for the given provider;
- one or more current trust ratings of the given provider; and
- one or more current performance measures of the given provider.

18. The method of claim 16 wherein the one or more trust factors relating to historical data of at least the given provider comprise at least one of:
- historical security compliance of the given provider;
- one or more prior transaction relationships of the given provider;
- one or more historical trust ratings of the given provider; and
- one or more historical performance measures of the given provider.

19. The method of claim 15 wherein the trust scores are generated at least in part utilizing a machine learning system.

20. The method of claim 19 wherein the machine learning system implements a neural network model that is initially trained on historical data and subsequently retrained in an unsupervised manner.

* * * * *